(12) United States Patent
Saitou et al.

(10) Patent No.: US 9,120,248 B2
(45) Date of Patent: *Sep. 1, 2015

(54) SHAPED SHEET

(75) Inventors: Nobuo Saitou, Saitama (JP); Toshitake Kobayashi, Saitama (JP); Kenichi Tachihara, Chiba (JP); Takashi Iizuka, Saitama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 1752 days.

This patent is subject to a terminal disclaimer.

(21) Appl. No.: 11/814,580

(22) PCT Filed: Jan. 25, 2006

(86) PCT No.: PCT/JP2006/301141
§ 371 (c)(1),
(2), (4) Date: Jul. 24, 2007

(87) PCT Pub. No.: WO2006/080348
PCT Pub. Date: Aug. 3, 2006

(65) Prior Publication Data
US 2009/0011191 A1    Jan. 8, 2009

(30) Foreign Application Priority Data
Jan. 25, 2005 (JP) ................................ 2005-016715

(51) Int. Cl.
*B32B 3/26* (2006.01)
*B29C 59/02* (2006.01)
(Continued)

(52) U.S. Cl.
CPC ............... *B29C 33/424* (2013.01); *B29C 33/40* (2013.01); *B29C 37/0053* (2013.01);
(Continued)

(58) Field of Classification Search
CPC .. B29C 33/40; B29C 33/424; B29C 30/0053; B29C 59/022; B29C 37/0053; B29C 2059/023; B44C 3/025; B44C 5/04; B44F 5/00; B29L 2031/722; B32B 38/0008; B32B 38/14; B32B 2310/14; B32B 2317/125; Y10T 428/24521; Y10T 428/24612
See application file for complete search history.

(56) References Cited

U.S. PATENT DOCUMENTS 5,130,072 A * 7/1992 Hemels et al. ................. 264/112
5,266,397 A * 11/1993 Ogawa et al. ................. 428/323
(Continued)

FOREIGN PATENT DOCUMENTS

EP    0 680 824    11/1995
JP    57-117922    7/1982
(Continued)

OTHER PUBLICATIONS

Machine Translation of JP 2003-340975.*
(Continued)

*Primary Examiner* — Gerard Higgins
*Assistant Examiner* — Sathavaram I Reddy
(74) *Attorney, Agent, or Firm* — Fitch Even Tabin & Flannery

(57) ABSTRACT

There are provided a shaping sheet provided on a surface thereof with a fine irregular shape which is capable of forming a fine pattern with a high-grade feel on a material to be shaped, and is excellent in releasability from the material, as well as a decorative plate shaped by the shaping sheet. The shaping sheet of the present invention includes a substrate, at least an ink layer partially formed on the substrate and a surface shaped layer which is present on and contacted with the ink layer so as to cover a whole surface including both a region where the ink layer is formed and a region where no ink layer is formed, wherein the surface shaped layer is formed by crosslinking and curing an ionizing radiation-curable resin composition, and has a convex shape on a surface thereof which is located in a portion just above the ink layer and in the vicinity of the portion. The shaping sheet is provided on a surface thereof with a fine irregular shape, which is capable of forming a fine pattern with a high-grade feel on a material to be shaped, and excellent in releasability from the material.

20 Claims, 13 Drawing Sheets

(51) Int. Cl.
*B32B 27/06* (2006.01)
*B29C 33/42* (2006.01)
*B29C 33/40* (2006.01)
*B29C 37/00* (2006.01)
*B44C 3/02* (2006.01)
*B44C 5/04* (2006.01)
*B44F 5/00* (2006.01)
*B29L 31/00* (2006.01)
*B32B 38/00* (2006.01)
*B32B 38/14* (2006.01)

(52) U.S. Cl.
CPC .............. *B29C 59/022* (2013.01); *B44C 3/025* (2013.01); *B44C 5/04* (2013.01); *B44F 5/00* (2013.01); *B29C 2059/023* (2013.01); *B29L 2031/722* (2013.01); *B32B 38/0008* (2013.01); *B32B 38/14* (2013.01); *B32B 2310/14* (2013.01); *B32B 2317/125* (2013.01); *Y10T 428/24521* (2015.01); *Y10T 428/24612* (2015.01)

(56) References Cited

U.S. PATENT DOCUMENTS

| | | | | |
|---|---|---|---|---|
| 5,656,701 | A * | 8/1997 | Miyamoto et al. | 525/453 |
| 6,277,929 | B1 * | 8/2001 | Kitahara et al. | 525/440.072 |
| 8,187,695 | B2 * | 5/2012 | Iizuka et al. | 428/195.1 |
| 2003/0113520 | A1 * | 6/2003 | Takahashi et al. | 428/201 |
| 2004/0026027 | A1 * | 2/2004 | Walters | 156/272.2 |
| 2004/0265569 | A1 * | 12/2004 | Yokochi et al. | 428/323 |

FOREIGN PATENT DOCUMENTS

| | | |
|---|---|---|
| JP | 57-156212 | 9/1982 |
| JP | 02-255336 | 10/1990 |
| JP | 05-092484 | 4/1993 |
| JP | 07-164519 | 6/1995 |
| JP | 07-276570 | 10/1995 |
| WO | WO 2005/030486 A1 | 4/2005 |

OTHER PUBLICATIONS

Extended European Search Report dated May 20, 2009, for Application No. EP 06 71 2336.

* cited by examiner

SHAPED SHEET

TECHNICAL FIELD

The present invention relates to shaping sheets provided thereon with a fine irregular shape which are capable of forming a fine pattern with a high-grade feel on a material to be shaped, and are excellent in releasability from the material, as well as decorative plates shaped by the shaping sheets.

BACKGROUND ART

As building materials including house equipments and interior materials such as furniture, top plates for desks, various counters and doors, there have been extensively used decorative plates generally formed by shaping a synthetic resin-based material, for example, melamine resin decorative plates, etc.

Hitherto, as thermosetting resin decorative plates having an irregular shape on a surface thereof, there are known those decorative plates whose surface is formed into an irregular shape by using an embossed metal mold or an irregular resin sheet, and those decorative plates whose surface is formed into an irregular shape by using a shaping sheet. However, when using the embossed metal mold having an irregularity on a surface thereof, it is required to subject the metal mold to surface treatments such as blasting and etching, resulting in limitations to fineness of the irregular shape or pattern formed on the decorative plates. In addition, upon producing the decorative plates made of thermosetting resins, an expensive mold plate as well as a spare mold plate are needed, resulting in increased burden of time and costs for production of the decorative plates. Thus, owing to considerable increase in the production costs, the obtained products tend to become very expensive. Also, when using the irregular resin sheet, since the sheet is hardly peeled or separated from the thermosetting resin decorative plates after the resin is cured, it is required that an aluminum foil, a polypropylene film or the like is interposed between the sheet and the mold plate, thereby making it very difficult to form a fine irregular pattern with a good sharpness.

Meanwhile, with the recent tendency of consumers toward high-grade products, furniture or desks as well as interior materials have been required to show a high-grade feeling. The decorative plates used in these products have also been demanded to exhibit a good appearance with a high-grade feeling. For this reason, it becomes important to impart a good texture to these products, and there have been proposed various methods for imparting fine irregular patterns to the decorative plates.

For example, there has been proposed the shaping sheet including a substrate sheet provided on a surface thereof with an irregular shape made of an ionizing radiation-curable resin in which a crosslinking density of the resin is adjusted so as to prevent the irregular shape from being broken or cracked when peeling or separating the shaping sheet from a material to be shaped, thereby faithfully reproducing a desired pattern on the material, and allowing the shaping sheet to be usable repeatedly (refer to claims of JP 7-164519A). However, since the method for production of the shaping sheet includes a step of peeling or separating the shaping sheet from an intaglio printing roll, expression of the irregular shape having fine concave portions tends to be possible only in a limited range.

Thus, the above method has such a problem that when the concave portions to be formed are very fine, neat irregular patterns are not attainable. If concave portions to be formed are thick to a certain extent, it will be possible to form an irregular shape on a surface of the substrate. However, in this case, there tend to arise problems such as formation of convex portions having a larger height than that of the raised portions, which results in lacking of reality, for example, in the case of woodgrain patterns, and poor appearance and touch feeling.

In addition, there has been proposed the shaping sheet including a substrate sheet and an irregular pattern layer formed on a surface of the substrate sheet by using a resin composition composed of an inorganic filler and a binder resin, wherein the irregular pattern layer is formed by repelling only the resin composition for forming the fine irregular pattern layer which is applied onto a pattern of a liquid repelling resin formed on the substrate sheet (refer to claims of JP 5-92484A). However, since the irregular pattern layer is formed by repelling the resin composition for forming the irregular pattern layer, the pattern formed by the irregular shape tends to become unstable. Further, since the resultant sheet must be aged for a predetermined period of time to cure the irregular pattern layer, there tends to arise such a problem that the production of the shaping sheet requires a very long time, thereby failing to quickly meet various needs of consumers.

DISCLOSURE OF THE INVENTION

Problem to be Solved by the Invention

The present invention has been made in view of the above conventional problems. An object of the present invention is to provide a shaping sheet having a fine irregular shape which is capable of forming a fine pattern with a high-grade feel on a surface of a material to be shaped, and exhibiting an excellent releasability therefrom, as well as a decorative plate shaped by using the shaping sheet.

Means for Solving the Problem

As a result of intensive and extensive researches to achieve the above object, the inventors have found that the above problems can be overcome by a shaping sheet which comprises a substrate, at least an ink layer partially formed on the substrate and a surface shaped layer which is present on and contacted with the ink layer so as to cover a whole surface thereof including both a region where the ink layer is formed and a region where no ink layer is formed, wherein the surface shaped layer is formed by crosslinking and curing an ionizing radiation-curable resin composition, and provided on a surface thereof with a convex shape which is located in a portion just above the ink layer and in the vicinity of the portion. The present invention has been accomplished on the basis of the finding.

Thus, the present invention provides:

(1) A shaping sheet comprising a substrate, at least an ink layer partially formed on the substrate and a surface shaped layer which is present on and contacted with the ink layer so as to cover a whole surface including both a region where the ink layer is formed and a region where no ink layer is formed, wherein the surface shaped layer is formed by crosslinking and curing an ionizing radiation-curable resin composition, and has a convex shape on a surface thereof which is located in a portion just above the ink layer and in the vicinity of the portion;

(2) the shaping sheet as described in the above aspect (1), wherein an ink forming the ink layer contains an urethane resin as a binder;

(3) the shaping sheet as described in the above aspect (1) or (2), wherein the ionizing radiation-curable resin composition contains a (meth)acrylate monomer;

(4) the shaping sheet as described in any one of the above aspects (1) to (3), wherein the ink forming the ink layer has an uneven thickness;

(5) the shaping sheet as described in the above aspect (4), wherein the ink layer has a thick film region having a relatively large thickness and a thin film region having a relatively small thickness, and the surface shaped layer is provided on a surface thereof with a convex shape having a relatively large height which is located on a portion just above and in the vicinity of the thick film region, and with a convex portion having a relatively small height which is located on a portion just above and in the vicinity of the thin film region;

(6) the shaping sheet as described in any one of the above aspects (1) to (5), wherein the convex shape has a height of from 1 to 10 μm;

(7) the shaping sheet as described in any one of the above aspects (1) to (6), wherein the surface shaped layer contains a reactive silicone;

(8) the shaping sheet as described in any one of the above aspects (1) to (7), wherein the ink forming the ink layer contains an extender pigment;

(9) the shaping sheet as described in any one of the above aspects (1) to (8), wherein the ionizing radiation-curable resin composition is an electron beam-curable resin composition;

(10) a decorative plate comprising a base plate which is shaped by the shaping sheet as described in any one of the above aspects (1) to (9);

(11) a decorative plate comprising a base plate to be pressed between heating pressure plates, wherein the base plate is shaped by inserting the shaping sheet as described in any one of the above aspects (1) to (9) between the base plate and one of the pressure plates and pressing the shaping sheet and the base plate together between the pressure plates;

(12) the decorative plate as described in the above aspect (10) or (11), wherein the base plate is a melamine resin decorative plate;

(13) the decorative plate as described in the above aspect (10) or (11), wherein the base plate is a diallyl phthalate (DAP) resin decorative plate;

(14) the decorative plate as described in the above aspect (10) or (11), wherein the base plate is a polyester decorative plate; and

(15) the decorative plate as described in the above aspect (10) or (11), wherein a pattern formed on the base plate is coordinated with a pattern formed on the shaping sheet.

Effect Of The Invention

In accordance with the present invention, there are provided a shaping sheet provided on a surface thereof with a fine irregular shape which is capable of forming a fine pattern with a high-grade feel on a material to be shaped, and excellent in releasability from the material, as well as a decorative plate shaped by the shaping sheet which has a fine irregular pattern shape on a surface thereof. In particular, when a woodgrain pattern is to be formed by the shaping sheet, an irregular feel of a vessel portion of the woodgrain pattern can be expressed with reality, so that the shaped decorative plate can exhibit the same texture as that of actual wood materials.

BRIEF EXPLANATION OF REFERENCE NUMERALS

1: Shaping sheet; 2: Substrate; 3: Ink layer; 3-*a*: Ink; 3-*b*: Ink; 3-*c*: Ink; 4: Interacting region; 4-*a*: Interacting region; 4-*b*: Interacting region; 4-*c*: Interacting region; 5: Surface shaped layer; 6: Penetration-preventing layer; 7: Convex shape; 7-*a*: Convex shape; 7-*b*: Convex shape; 7-*c*: Convex shape; 8: Fine particles or baked kaolin particles; 8-*a*: Fine particles or baked kaolin particles; 8-*b*: Fine particles or baked kaolin particles; 9: Adhesive layer; 10: Support plate; 11: Decorative plate; 12: Fine irregular surface; 13: Concave shape; 13-*a*: Concave shape; 13-*b*: Concave shape; and 13-*c*: Concave shape.

PREFERRED EMBODIMENTS FOR CARRYING OUT THE INVENTION

The shaping sheet of the present invention includes a substrate, at least an ink layer partially formed on the substrate and a surface shaped layer which is present on and contacted with the ink layer so as to cover a whole surface including both a region where the ink layer is formed and a region where no ink layer is formed, wherein the surface shaped layer is formed by crosslinking and curing an ionizing radiation-curable resin composition, and has a convex shape on a surface thereof which is located in a portion just above the ink layer and in the vicinity of the portion.

Figure 1:
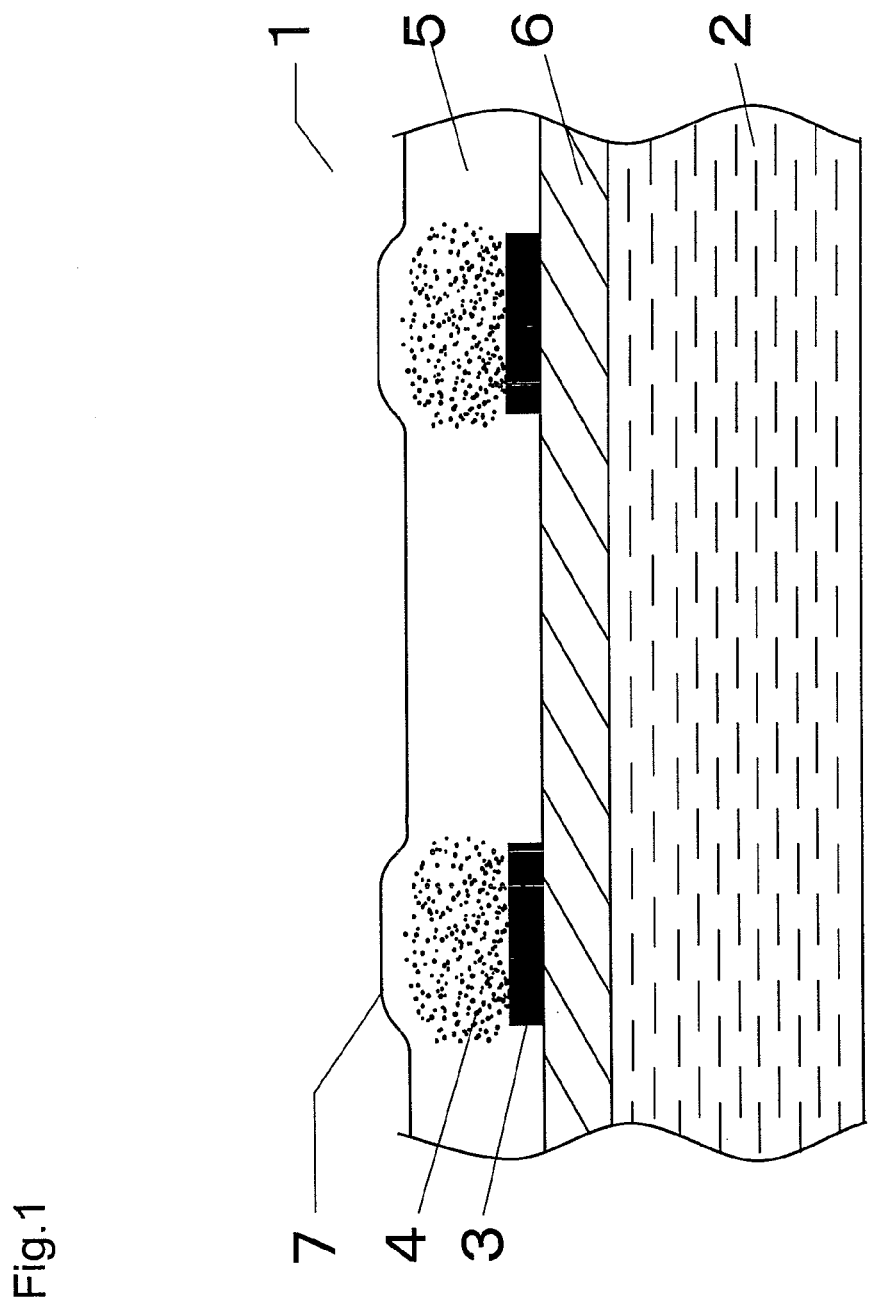
FIG. 1 is a schematic view showing a section of a shaping sheet according to the present invention.
Figure 2:
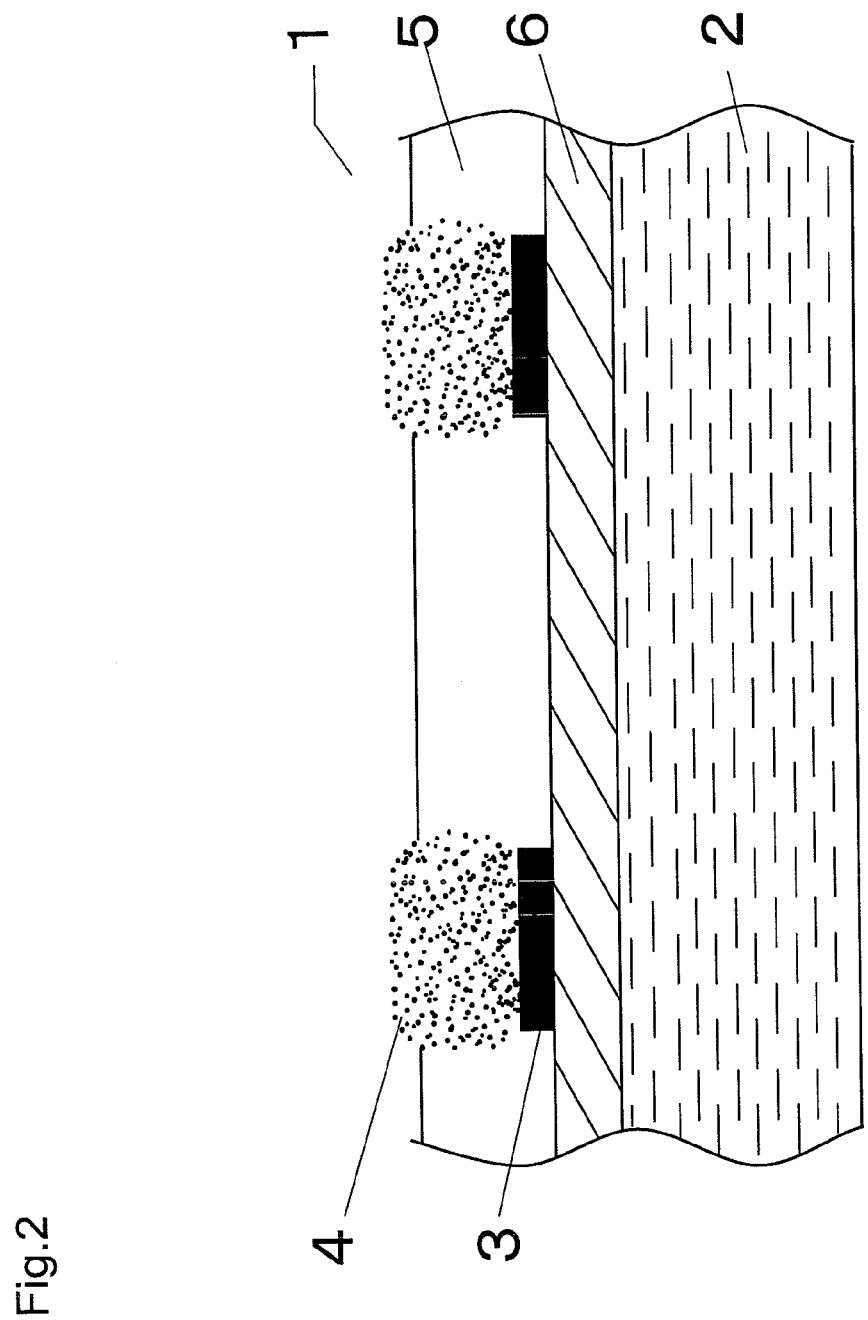
FIG. 2 is a schematic view showing a section of a shaping sheet according to the present invention.

The structure of the shaping sheet according to the present invention is described in detail by referring to FIGS. 1 and 2. FIGS. 1 and 2 are respectively a schematic view showing a section of a shaping sheet 1 of the present invention. In the embodiment shown in FIG. 1, a uniform penetration-preventing layer 6 covering a whole surface of the substrate 2, an ink layer 3 and a surface shaped layer 5 formed by crosslinking and curing an ionizing radiation-curable resin composition are successively laminated on the substrate 2 in this order. The ink layer 3 is partially present, and the surface shaped layer is provided with an interacting region 4 in its portion located just above the ink layer and in the vicinity thereof. Meanwhile, in the drawings, the interacting region 4 is represented by collection of points.

An outermost surface of the surface shaped layer 5 which is located above the interacting region 4 is raised up owing to formation of the ink layer 3, and formed into a convex shape 7. When such a convex shape is present on the surface of the surface shaped layer 5, the obtained shaping sheet as a whole is provided on a surface thereof with an irregular shape. Meanwhile, the height of the convex shape is not particularly limited as long as the effects of the present invention can be suitably exhibited, and is usually in the range of from 1 to 10 μm. Further, the convex shape having a height of from 1 to 3 μm may also be sufficient to attain the effects of the present invention.

The extent of spread of the interacting region 4 formed in the surface shaped layer 5 is not particularly limited as long as the effects of the present invention can be suitably exhibited. As shown in FIG. 1, the interacting region 4 may extend from the surface of the ink layer 3 in the thickness direction of the surface shaped layer 5 and terminate at the mid thereof. Alternatively, as shown in FIG. 2, the interacting region 4 may reach the outermost surface of the surface shaped layer 5.

Next, the substrate and the respective layers are described in detail by referring to FIGS. 1 to 9.

The substrate 2 used in the present invention is not particularly limited as long as it is ordinarily usable as a substrate for shaping sheets, and may be appropriately selected from various papers, plastic films, plastic sheets, metal foils, metal sheets, metal plates and ceramic-based materials according to the applications thereof. These materials may be used alone or in the form of a laminate composed of an optional combination thereof such as a composite of papers and a composite of a paper and a plastic film.

One or both surfaces of the substrate, in particular, a plastic film substrate or a plastic sheet substrate, may be subjected to physical or chemical surface treatments such as those using oxidation method or convex/concave shaping method, if required, in order to enhance adhesion of the substrate to the layer to be laminated thereon.

Examples of the treatments using the oxidation method include a corona discharge treatment, a chromate treatment, a flame treatment, a hot air treatment and an ozone/ultraviolet treatment. Examples of the treatments using the convex/concave shaping method include a sand blast treatment and a solvent treatment. These surface treatments may be appropriately selectively conducted depending upon the kind of substrate used. In general, among these treatments, the corona discharge treatment is preferably used in view of good effects and facilitated operation thereof.

In addition, for the purposes of enhancement of interlaminar bonding strength between the substrate and the respective layers, etc., a primer layer may be formed on the substrate.

Examples of various papers used as the substrate include thin cut sheet papers, kraft papers and titanium papers. These paper substrates may further contain resins such as acrylic resins, styrene-butadiene rubbers, melamine resins and urethane resins (by either impregnation with the resins after paper-making or inclusion of the resins during paper-making) in order to enhance an interlaminar bonding strength between fibers of the paper substrate or between the paper substrate and the other layers or prevent formation of fuzzes. Examples of the resin-containing paper substrate include interlaminar reinforced papers and resin-impregnated papers.

In addition to the above papers, as the substrate, there may be used various papers which are frequently employed in building applications, such as linter papers, paper boards, base papers for gypsum boards and raw fabrics for vinyl-based wall papers which are composed of a paper and a vinyl chloride resin layer formed on a surface of the paper. Further, as the substrate, there may also be used such papers employed in business applications or for ordinary printing and packaging purposes such as coated papers, art papers, parchment papers, glassine papers, paraffin papers and Japanese papers. Although being distinguished from these papers, as the substrate, there may also be used woven fabrics and nonwoven fabrics of various fibers which have an appearance and properties similar to those of papers. Examples of various fibers include inorganic fibers such as glass fibers, asbestos fibers, potassium titanate fibers, alumina fibers, silica fibers and carbon fibers, and synthetic resin fibers such as polyester fibers, acrylic fibers and vinylon fibers.

The plastic film or the plastic sheet may be made of various synthetic resins. Examples of the synthetic resins include polyolefin resins such as polyethylene resins, polypropylene resins, polymethyl pentene resins and olefin-based thermoplastic elastomers; vinyl-based resins such as polyvinyl chloride resins, polyvinylidene chloride resins, polyvinyl alcohol resins, vinyl chloride/vinyl acetate copolymer resins, ethylene/vinyl acetate copolymer resins and ethylene/vinyl alcohol copolymer resins; polyester resins such as polyethylene terephthalate resins, polybutylene terephthalate resins, polyethylene naphthalate/isophthalate copolymer resins and polyester-based thermoplastic elastomers; acrylic resins such as polymethyl (meth)acrylate resins, polyethyl (meth)acrylate resins and polybutyl (meth)acrylate resins; polyamide resins such as typically nylon 6 and nylon 66; cellulose-based resins such as cellulose triacetate resins and cellophane; polystyrene resins; polycarbonate resins; polyarylate resins; and polyimide resins.

Examples of the metal foil, metal sheet or metal plate include those made of aluminum, iron, stainless steel and copper, as well as those coated with these metals by plating, etc. Examples of the ceramic materials include ceramic building materials such as gypsum boards, calcium silicate boards and wood chip cement boards; pottery; glass; porcelain enamel; and baked tile. Examples of the other substrate include composites of various materials such as fiber-reinforced plastic (FRP) plates, laminates obtained by attaching an iron plate on both surfaces of a paper honeycomb, and laminates obtained by sandwiching a polyethylene resin sheet between two aluminum plates.

Among these materials, as the substrate 2, preferred are those materials having excellent heat resistance and dimensional stability, and more preferred are polyester films such as a polyethylene terephthalate film.

The thickness of the substrate 2 is not particularly limited. The thickness of the plastic sheet substrate is usually from about 20 to about 150 μm and preferably from 30 to 100 μm. The basic weight of the paper substrate is usually from about 20 to about 150 g/m$^2$ and preferably from 30 to 100 g/m$^2$.

The penetration-preventing layer 6 shown in FIG. 1 may be optionally provided, and has a function of inhibiting penetration of an ink used for forming the below-mentioned ink layer 3 and an ionizing radiation-curable resin for forming the below-mentioned surface shaped layer 5 into the substrate 2. In particular, the effect of the penetration-preventing layer 6 becomes more remarkable when the substrate 2 is made of a permeable material such as papers and nonwoven fabrics. Therefore, the penetration-preventing layer 6 may be disposed between the substrate 2 and the ink layer 3. As the penetration-preventing layer 6, a uniform layer obtained by crosslinking and curing a curable resin which exhibits a good adhesion to the ionizing radiation-curable resin forming the surface shaped layer 5 is usually provided between the substrate 2 and the ink layer 3 as shown in FIG. 1, thereby also exhibiting the effect of enhancing a bonding strength of the substrate 2 to the ink layer 3 and the surface shaped layer 5.

In the shaping sheet of the present invention, the ink layer 3 may be laminated on the penetration-preventing layer 6, etc., which may be optionally provided, as shown in FIG. 1. The ink layer 3 serves for forming a concavo-convex shape on a surface of the surface shaped layer 5.

The mechanism of formation of the concavo-convex shape according to the present invention is not clearly determined. However, from the results of various experiments, observations and measurements, it is suggested that by appropriately selecting combination of the respective materials and coating conditions upon application of an uncured ionizing radiation-curable resin for forming the surface shaped layer 5 onto the surface of the ink layer 3, the resin component of the ink layer 3 and the surface shaped layer are interacted with each other to cause partial elution, dispersion and mixing therebetween. In such a case, it is considered that the respective resin components of the ink contained in the ink layer 3 and the uncured ionizing radiation-curable resin are not completely compatibilized with each other for a short period of time, but are kept in a suspended state and located in a portion just above the ink layer 3 and in the vicinity of the portion, so that the suspended portion forms an interacting region, thereby producing the convex shape. When the surface shaped layer is crosslinked and cured while maintaining the suspended state, it is suggested that such a suspended state is fixed, so that the interacting region 4 is partially formed in the surface shaped layer as shown in FIGS. 1 and 2, thereby generating the convex shape 7.

The ink forming the ink layer 3 has a property capable of interacting with the ionizing radiation-curable resin composition for forming the surface shaped layer 5 to cause elution, dispersion and mixing therebetween, and therefore may be appropriately determined in view of the relation with the (uncured) ionizing radiation-curable resin composition. More specifically, the ink preferably contains a non-crosslinked resin as a binder resin. Examples of the suitable binder resin of the ink include thermoplastic (non-crosslinked type) urethane resins. In order to obtain a still stronger interaction with the ionizing radiation-curable resin composition for forming the surface shaped layer 5 and obtain a more remarkable irregular pattern feel, the content of the urethane resin in the ink is preferably 50% by mass or higher.

The above urethane resin is preferably selected from non-crosslinked type resins, namely not those resins having a three-dimensionally crosslinked network steric molecular structure, but thermoplastic resins having a linear molecular structure. The non-crosslinked type urethane resins may be produced by reacting a polyol component such as acrylic polyols, polyester polyols and polyether polyols, with an isocyanate component, e.g., aromatic isocyanates such as tolylene diisocyanate, xylene diisocyanate and diphenyl-methane diisocyanate or aliphatic or alicyclic isocyanates such as isophorone diisocyanate, hexamethylene diisocyanate and hydrogenated tolylene diisocyanate. The number of hydroxyl groups per one molecule of the polyol and the number of isocyanate groups per one molecule of the isocyanate are each 2 as an average value. The average molecular weight of the urethane resin is preferably from about 10,000 to about 50,000, and the glass transition temperature (Tg) of the urethane resin is preferably from about −70 to about −40° C., in view of forming a suitable interacting region.

In addition, the binder resin of the ink may also contain, if required, saturated or unsaturated polyester resins, acrylic resins or vinyl chloride/vinyl acetate copolymers in order to adjust the extent of formation of the interacting region, namely the extent of height of the convex shape. Among these resins, preferred are polyester resins, and more preferred are unsaturated polyester resins. The amount of the unsaturated polyester resins added is preferably from 10 to 50% by mass on the basis of a whole amount of the binder resin contained in the ink. When the amount of the unsaturated polyester resins added is controlled to the above-specified range, a sufficient effect of enhancing formation of the interacting region can be attained. The unsaturated polyester resins are not particularly limited as long as they are reaction products of an unsaturated dicarboxylic acid and a glycol. Examples of the unsaturated dicarboxylic acid include maleic acid, fumaric acid and itaconic acid. Examples of the glycol include ethylene glycol, diethylene glycol, propylene glycol and butylene glycol.

Further, the ink composition for forming the ink layer 3 preferably contains an extender pigment. The inclusion of the extender pigment allows the ink composition to exhibit a thixotropic property. As a result, when forming the ink layer 3 by a printing method using a printing plate, the shape of the ink composition applied thereto can be maintained, so that a sharpness of the irregular shape at an end portion at which transition between convex and concave portions is caused, can be emphasized, thereby enabling sharp expression of the design pattern.

The extender pigment used in the present invention is not particularly limited, and may be appropriately selected, for example, from silica, talc, clay, barium sulfate, barium carbonate, calcium sulfate, calcium carbonate, magnesium carbonate, etc. Among these extender pigments, preferred is silica because the silica has a high freedom of selection of material as to oil absorption, particle size and pore volume and is excellent in designing property, whiteness and coating stability as an ink, and more preferred is a silica powder. The particle size of silica is preferably from 0.1 to 5 μm. The ink containing silica having a particle size of 0.1 μm or larger is prevented from exhibiting an extremely high thixotropic property and a too high viscosity, resulting in facilitated control of printing therewith. In other words, the irregular shape to be formed can be readily controlled. Also, when it is intended to express a vessel pattern upon production of the woodgrain pattern, if the particle size of silica is smaller than a thickness of the ink coating layer of the vessel pattern portion which is usually 5 μm or smaller, the extent of protrusion of the silica particles on a surface of the ink coating layer is suppressed to a relatively small level, and further the protruded particles are unnoticeable, thereby allowing the interacting region formed to be kept in a natural state, preventing occurrence of visually strange feel of the irregular shape, and therefore attaining a naturally finished sheet.

The content of the extender pigment in the ink composition is preferably in the range of 5 to 15% by mass. The ink composition containing the extender pigment in an amount of 5% by mass or more can exhibit a sufficient thixotropic property, whereas the ink composition containing the extender pigment in an amount of 15% by mass or less is completely free from deterioration in the effect of forming the convex shape.

The coating amount of the ink for forming the ink layer 3 is preferably in the range of 1 to 30 g/m². When the coating amount of the ink is 1 g/m² or more, the above-described interaction between the ink and the ionizing radiation-curable resin composition suitably takes place to form a sufficient interacting region, thereby producing a sufficient irregular shape on the surface of the resultant shaping sheet. On the other hand, when the coating amount of the ink is 30 g/m² or less, the printing with the ink can be suitably made without any mechanical limitations, resulting in economical advantages. From these viewpoints, the coating amount of the ink is more preferably from 1 to 10 g/m² and still more preferably from 1 to 7 g/m².

Further, by varying the coating amount of the ink composition, the obtained ink layer 3 has an uneven ink thickness, thereby allowing the extent of the difference in height of the convex portions to be stepwise or continuously changed. As a result, the obtained shaping sheet can exhibit a gradation pattern owing to the irregular shape which is changed stepwise, or a continuous pattern owing to the irregular shape which is changed continuously.

The reason therefor is considered to be that as the coating amount of the ink layer 3 is relatively increased, the interaction between the ink layer 3 and the surface shaped layer 5 is relatively enhanced, so that the extent of a suspended condition between the layers is increased, thereby further increasing a height of the convex shape.

Figure 3:
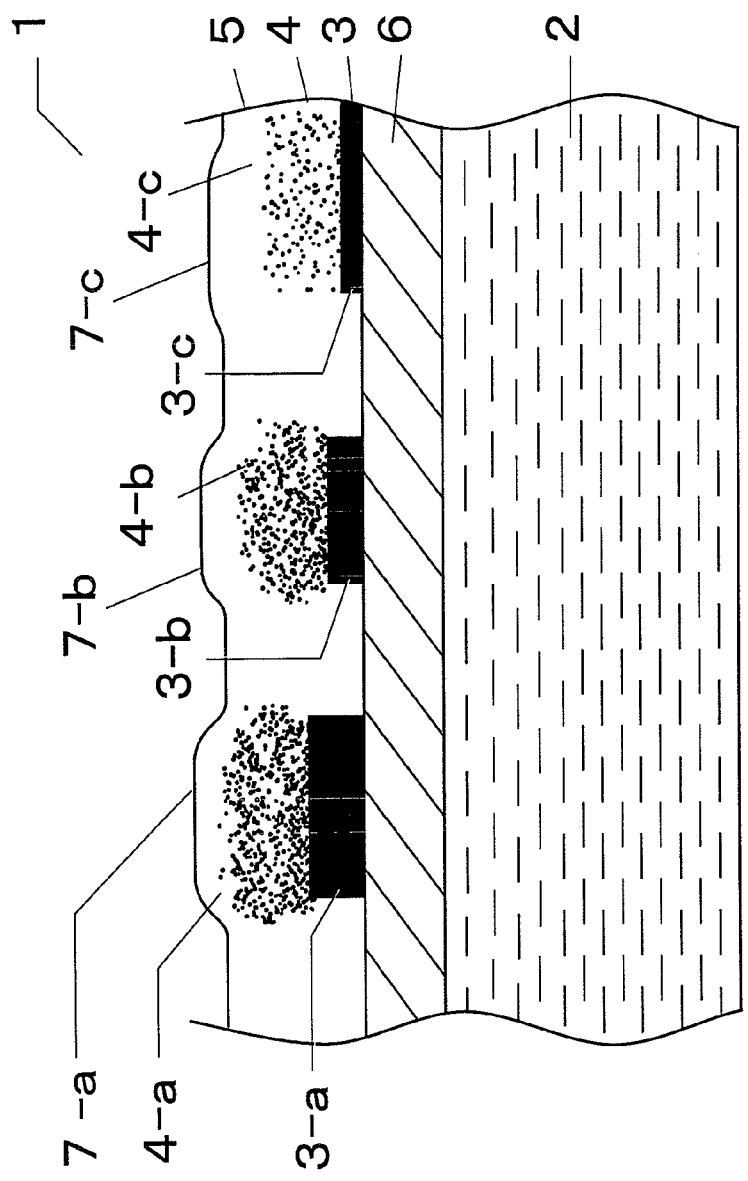
FIG. 3 is a schematic view showing a section of a shaping sheet according to the present invention.
Figure 4:
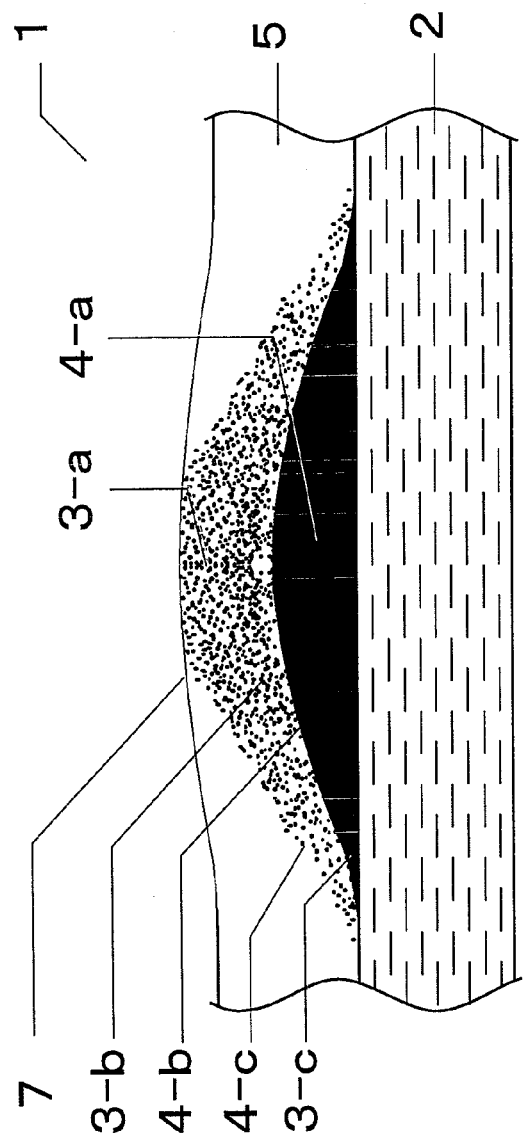
FIG. 4 is a schematic view showing a section of a shaping sheet according to the present invention.
Figure 5:
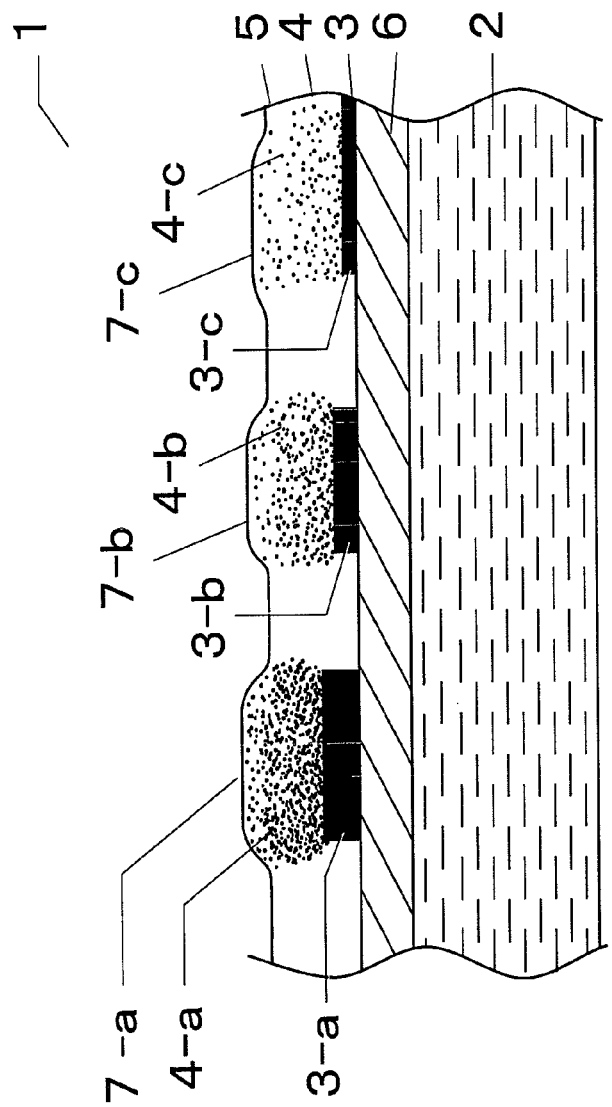
FIG. 5 is a schematic view showing a section of a shaping sheet according to the present invention.

The shaping sheet of the present invention is further explained in detail by referring to FIGS. 3 to 5. In FIG. 3, the respective portions formed from inks 3-*a*, 3-*b* and 3-*c* for forming the ink layer 3 are different in thickness from each other. More specifically, the thicknesses of the respective ink coating portions of the ink layer 3 are relatively reduced in the order of the inks 3-*a*, 3-*b* and 3-*c* in a stepwise manner. The difference in thickness between the respective ink coating portions of the ink layer 3 allows interacting regions 4-*a*, 4-*b* and 4-*c* to be changed stepwise. As a result, convex shapes in the obtained irregular shape are stepwise increased in height in the order of 7-*c*, 7-*b* and 7-*a*. The reason therefor is considered to be that since the respective inks forming the ink layer 3 are uneven in coating thickness, i.e., are coated such that the thicknesses thereof are reduced in the order of 3-*a*, 3-*b* and 3-*c*, the portion with a larger ink thickness shows a more remarkable increase in height of the convex shape so that the heights of the convex shapes are stepwise reduced in the order to 3-*a*, 3-*b* and 3-*c*. Thus, if the ink thickness is varied at still narrower intervals, the irregular pattern shape can also be changed continuously.

The above structure allows the resultant shaping sheet to exhibit further various delicate textures. The thickness of the ink forming the ink layer 3 may be readily varied usually by changing the coating amount of the ink. When the coating amount of the ink is continuously varied, the pattern of the irregular shape may be changed not stepwise but continuously.

Next, in the embodiment as shown in FIG. 4, the ink layer 3 is laminated on the substrate 2 such that the thickness of the ink layer is continuously varied in a plane parallel with the surface of the substrate (i.e., the thickness is large in a central portion of the layer, and is continuously reduced toward a side portion thereof), and the surface shaped layer 5 obtained by crosslinking and curing the ionizing radiation-curable resin composition is further laminated thereover. Similarly to the shaping sheet shown in FIG. 3, a portion of the surface shaped layer which is located just above the ink layer and in the vicinity thereof forms the interacting region. In the embodiment shown in FIG. 4, as the thicknesses of the ink layer is continuously increased in the order of 3-*c*, 3-*b* and 3-*a*, the heights of convex shapes owing to the interacting regions 4-*c*, 4-*b* and 4-*a* are continuously increased in this order. As a result, the heights of convex shapes formed on the surface shaped layer 5 are continuously increased in the same order.

The extent of spread of the interacting region 4 formed in the surface shaped layer 5 is not particularly limited as long as the effects of the present invention can be suitably exhibited. As shown in FIG. 3, the interacting region may extend from the surface of the ink layer 3 in the thickness direction of the surface shaped layer 5 and may terminate in the mid of the thickness direction. Alternatively, as shown in FIGS. 4 and 5, the interacting region may reach an outermost surface of the surface shaped layer 5. Further, the interacting region may form a convex shape on the outermost surface of the surface shaped layer 5.

The surface shaped layer 5 is formed by crosslinking and curing the ionizing radiation-curable resin composition as described above. The ionizing radiation-curable resin composition used herein means a resin composition having energy quanta capable of crosslinking and polymerizing molecules thereof when exposed to electromagnetic wave or charged particle beam, namely such a resin composition capable of undergoing crosslinking and curing reactions upon irradiating an ultraviolet ray or an electron beam thereto. More specifically, the ionizing radiation-curable resin composition may be appropriately selected from polymerizable monomers and polymerizable oligomers or prepolymers thereof which are conventionally used as an ionizing radiation-curable resin composition.

Typical examples of the suitable polymerizable monomers include (meth)acrylate monomers containing a radical-polymerizable unsaturated group in a molecule thereof. When such a (meth)acrylate monomer is contained in the ionizing radiation-curable resin composition, the above interaction between the surface shaped layer and the ink layer can be generated, resulting in occurrence of suitable difference in the irregular shape. In order to attain a stronger interaction between the surface shaped layer and the ink layer and obtain a larger difference in the irregular shape, the content of the (meth)acrylate monomer in the ionizing radiation-curable resin composition is preferably 50% by mass or larger.

The (meth)acrylate monomers are preferably polyfunctional (meth)acrylates. Meanwhile, the term "(meth)acrylate" used herein means an acrylate, a methacrylate or both thereof. The polyfunctional (meth)acrylates are not particularly limited as long as they have two or more ethylenically unsaturated bonds in a molecule thereof. Specific examples of the polyfunctional (meth)acrylates include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, neopentyl glycol di(meth)acrylate hydroxypivalate, dicyclopentenyl di(meth)acrylate, caprolactone-modified dicyclopentenyl di(meth)acrylate, ethyleneoxide-modified phosphoric acid di(meth)acrylate, allylated cyclohexyl di(meth)acrylate, isocyanurate di(meth)acrylate, trimethylolpropane tri(meth)acrylate, ethyleneoxide-modified trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, tris(acryloxyethyl)isocyanurate, propionic acid-modified dipentaerythritol penta(meth)acrylate, dipentaerythritol hexa(meth)acrylate, ethyleneoxide-modified dipentaerythritol hexa(meth)acrylate and caprolactone-modified dipentaerythritol hexa(meth)acrylate. These polyfunctional (meth)acrylates may be used alone or in combination of any two or more thereof.

In the present invention, for the purpose of reducing a viscosity of the polyfunctional (meth)acrylate, a monofunctional (meth)acrylate may be appropriately used in combination with the polyfunctional (meth)acrylate unless the effects of the present invention are adversely affected. Examples of the monofunctional (meth)acrylate include methyl (meth) acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate and isobornyl (meth)acrylate. These monofunctional (meth)acrylates may be used alone or in combination of any two or more thereof.

As the polymerizable oligomer, there may be used oligomers having a radical-polymerizable unsaturated group in a molecule thereof. Examples of the polymerizable oligomers include epoxy (meth)acrylate-based oligomers, urethane (meth)acrylate-based oligomers, polyester (meth)acrylate-based oligomers and polyether (meth)acrylate-based oligomers. The epoxy (meth)acrylate-based oligomers may be produced, for example, by esterifying an oxirane ring of a relatively low-molecular weight bisphenol-type epoxy resin or novolak-type epoxy resin with (meth)acrylic acid. In addition, there may also be used carboxyl-modified epoxy (meth) acrylate oligomers obtained by partially modifying the above epoxy (meth)acrylate-based oligomers with a dibasic carboxylic anhydride. The urethane (meth)acrylate-based oligomers may be produced, for example, by esterifying a polyurethane oligomer obtained by reacting a polyether polyol or a polyester polyol with polyisocyanate, with (meth)acrylic acid. The polyester (meth)acrylate-based oligomers may be produced, for example, by esterifying a hydroxyl group of a polyester oligomer having hydroxyl groups at both terminal ends thereof which is obtained by condensation between a polycarboxylic acid and a polyhydric alcohol, with (meth) acrylic acid, or by esterifying a terminal hydroxyl group of an oligomer obtained by adding an alkyleneoxide to a polycarboxylic acid, with (meth)acrylic acid. The polyether (meth) acrylate-based oligomers may be produced, for example, by esterifying a hydroxyl group of a polyether polyol with (meth)acrylic acid.

Examples of the other polymerizable oligomers include polybutadiene (meth)acrylate-based oligomers having a high hydrophobic property which is in the form of a polybutadiene oligomer having a (meth)acrylate group in a side chain thereof; silicone (meth)acrylate-based oligomers having a polysiloxane bond in a main chain thereof; aminoplast resin (meth)acrylate-based oligomers obtained by modifying an aminoplast resin having a large number of reactive groups in a small molecule thereof; and oligomers having a cation-polymerizable functional group in a molecule thereof such as a novolak-type epoxy resin, a bisphenol-type epoxy resin, an aliphatic vinyl ether and an aromatic vinyl ether.

In the present invention, as described above, it is important that the ink for forming the ink layer 3 and the ionizing radiation-curable resin composition for forming the surface shaped layer 5 are interacted with each other. Therefore, the suitable ink and ionizing radiation-curable resin composition are selected in view of good interaction therebetween. The ionizing radiation-curable resin composition preferably contains a polyfunctional (meth)acrylate monomer.

When an ultraviolet-curable resin composition is used as the ionizing radiation-curable resin composition, a photopolymerization initiator is preferably added thereto in an amount of about 0.1 to about 5 parts by mass on the basis of 100 parts by mass of the resin composition. The photopolymerization initiator may be appropriately selected from conventionally used ones without particular limitations. Examples of the photopolymerization initiator used for polymerizable monomers or polymerizable oligomers containing a radical-polymerizable unsaturated group in a molecule thereof include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenyl acetophenone, 2,2-diethoxy-2-phenyl acetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenyl benzophenone, 4,4'-diethylaminobenzophenone, dichlorobenzophenone, 2-methyl anthraquinone, 2-ethyl anthraquinone, 2-tert-butyl anthraquinone, 2-aminoanthraquinone, 2-methyl thioxanthone, 2-ethyl thioxanthone, 2-chlorothioxanthone, 2,4-dimethyl thioxanthone, 2,4-diethyl thioxanthone, benzyl dimethyl ketal and acetophenone dimethyl ketal.

Examples of the photopolymerization initiator used for polymerizable oligomers containing a cation-polymerizable functional group in a molecule thereof, etc., include aromatic sulfonium salts, aromatic diazonium salts, aromatic iodonium salts, metallocene compounds, and benzoin sulfonic esters.

Also, examples of a photosensitizer usable in the ionizing radiation-curable resin composition include p-dimethyl benzoate, tertiary amines and thiol-based sensitizers.

In the present invention, an electron beam-curable resin composition is preferably used as the ionizing radiation-curable resin composition. The electron beam-curable resin composition can be used under a solvent-free condition and is therefore favorable in view of environmental protection and human health, and further can exhibit a stable curing property without requiring any photopolymerization initiator.

Also, the surface shaped layer 5 preferably contains baked kaolin particles. By incorporating the baked kaolin particles into the surface shaped layer, the irregular shape formed on the surface of the shaping sheet becomes more fine, and the marring resistance thereof is further enhanced. The "marring" used herein means occurrence of small flaws or scuffs generated when rubbing a surface of the sheet, and the "excellent marring resistance" means that the sheet hardly suffers from occurrence of flaws or scuffs even when rubbed. When imparting such a marring resistance to the shaping sheet, the surface shaped layer is strengthened, resulting in production of the shaping sheet exhibiting a good durability even when used for a long period of time, as well as reduction in costs for production of the decorative plate.

The baked kaolin particles used for imparting a finer irregular shape and a good marring resistance to the surface of the shaping sheet may be those kaolin particles obtained by baking ordinary (hydrous) kaolin particles. When adding the baked kaolin particles as a filler to the surface shaped layer, the resultant shaping sheet can exhibit an improved marring resistance which has not been realized by silica particles or unbaked hydrous kaolin particles. Meanwhile, the particle size of the baked kaolin particles may be appropriately determined according to applications, properties as required, etc. For example, there may be used such baked kaolin particles having an average particle size of about 0.5 to about 2 µm. The amount of the baked kaolin particles added may also be appropriately determined according to applications, properties as required, etc. For example, the amount of the baked kaolin particles added is from about 5 to about 50 parts by mass on the basis of 100 parts by mass of the ionizing radiation-curable resin or 100 parts by mass of a sum of the ionizing radiation-curable resin and other resins if the surface shaped layer further contains the other resins.

Meanwhile, the baked kaolin particles are more excellent in coating stability than the hydrous kaolin particles.

The baked kaolin particles used in the present invention may be further subjected to surface treatments. When using the surface-treated baked kaolin particles, the obtained shaping sheet can be further enhanced in marring resistance. The surface treatments may include those treatments with a silane coupling agent. Examples of the silane coupling agent include known silane coupling agents containing an alkoxy group, an amino group, a vinyl group, an epoxy group, a mercapto group, a chloro group, etc. Specific examples of the silane coupling agent include γ-aminopropyl triethoxysilane, γ-methacryloxypropyl trimethoxysilane, γ-methacryloxypropyl methyl dimethoxysilane, γ-methacryloxypropyl dimethyl methoxysilane, γ-methacryloxypropyl triethoxysilane, γ-methacryloxypropyl dimethyl ethoxysilane, γ-acryloxypropyl trimethoxysilane, γ-acryloxypropyl methyl dimethoxysilane, γ-acryloxypropyl dimethyl methoxysilane, γ-acryloxypropyl triethoxysilane, γ-acryloxypropyl methyl diethoxysilane, γ-acryloxypropyl dimethyl ethoxysilane, vinyl triethoxysilane, γ-glycidoxypropyl trimethoxysilane and γ-mercaptopropyl trimethoxysilane.

The ionizing radiation-curable resin composition used for producing the shaping sheet of the present invention preferably contains a reactive silicone. When the reactive silicone is incorporated into the surface shaped layer 5, the resultant shaping sheet is enhanced in releasability and further can be improved in durability when used repeatedly and continuously.

The reactive silicone used herein means those modified silicone oils containing an organic group introduced into a side chain or a terminal end thereof which exhibit a reactivity owing to properties of the organic group introduced. Specific examples of the reactive silicone include modified silicone oils of a side chain-modified type, a both terminal end-modified type, one terminal end-modified type, a side chain/both terminal end-modified type, etc., in which the modifying organic group introduced is selected from amino group, epoxy group, mercapto group, carboxyl group, carbinol group, phenol group, methacrylic group, different kinds of functional groups, etc.

The reactive silicone is reacted with, bonded to and integrated with the resin when cured by exposure to an ionizing radiation. Therefore, the reactive silicone is free from bleeding-out onto the surface of the decorative plate when the plate is subjected to heat- and press-molding for producing the decorative plate of the present invention, so that adhesion between the shaping sheet and the decorative plate is considerably enhanced, thereby enabling the resultant decorative plate to be imparted with a delicate design pattern having a fine irregular shape.

The amount of the reactive silicone used is from about 0.1 to about 50 parts by mass and preferably from about 0.5 to about 10 parts by mass on the basis of 100 parts by mass of the ionizing radiation-curable resin. When the amount of the reactive silicone used is 0.1 part by mass or more, the shaping sheet is sufficiently peeled or separated from the surface of the decorative plate, and the irregular shape on the surface of the shaping sheet can be suitably maintained, so that the shaping sheet can be used with a good durability for a long period of time. On the other hand, when the amount of the reactive silicone used is 50 parts by mass or less, no cissing occurs upon applying the ionizing radiation-curable resin composition onto the substrate, so that the surface of the obtained coating film is free from roughness, resulting in enhanced coating stability.

In the shaping sheet of the present invention, fine particles are preferably blended in the ionizing radiation-curable resin composition. As the fine particles, there may be used those particles having an average particle size which is close to a plus-side value of a maximum thickness of the surface shaped layer 5 located just above the ink layer 3. The shaping sheet blended with the fine particles according to the present invention is explained in detail by referring to FIG. 6. In the shaping sheet shown in FIG. 6, the fine particles are blended in the ionizing radiation-curable resin composition.

The fine particles 8 (8-$a$ and 8-$b$) blended in the surface shaped layer have an average particle size $d_A$ which is close to a plus-side value of a maximum thickness $t_M$ of the surface shaped layer 5 located just above the ink layer 3, i.e., $d_A$ is slightly larger than $t_M$. As a result, the fine particles 8-$a$ are protruded on the surface of the surface shaped layer 5 located just above the ink layer 3. The surface portion of the surface shaped layer on which the fine particles are protruded has a convex shape, so that a fine irregular feel can be produced on the surface of the shaping sheet. Simultaneously with formation of the protruded fine particles, the interacting region 4 which generates a convex shape is formed within the surface shaped layer 5 in its portion located just above the ink layer 3 and in the vicinity of the portion owing to the interaction between the ink in the ink layer 3 and the ionizing radiation-curable resin composition forming the surface shaped layer 5.

On the other hand, the fine particles 8-$b$ located in a portion other than the portion just above the ink layer 3 are not protruded from the surface of the surface shaped layer and therefore exhibit no effect of forming the convex shape. Thus, the effect of forming the convex shape by the fine particles is variously changed depending upon the position within the surface shaped layer where the fine particles are present.

Therefore, owing to the effects of the interacting region 4 in the surface shaped layer 5 and the protruded fine particles on the surface of the surface shaped layer 5 as well as the effect of the convex shape produced by forming the above ink layer 3, the irregular shape formed on the shaping sheet becomes finer and is further emphasized.

Meanwhile, the maximum thickness $t_M$ of the surface shaped layer 5 located just above the ink layer 3 means the thickness of the surface shaped layer 5 itself when any convex shape produced by forming the ink layer 3 is not present. Whereas, when the convex shape is formed, the maximum thickness $t_M$ means the thickness including a height of the protrusion.

The particle size distribution of the fine particles is preferably closer to a monodisperse system, since the amount of the fine particles used is more readily controlled, and the above aimed effects can be suitably exhibited even when the fine particles are used in a small amount.

In the present invention, a coefficient of variation (CV value) of particle size distribution of the fine particles which is represented by the formula: [(standard deviation of particle size/average particle size)×100] is preferably 30% or lower. The fine particles having a CV value of 30% or lower have a practically acceptable particle size distribution and can sufficiently exhibit the above aimed effects even when used in a reasonable amount. The CV value of the fine particles is more preferably 20% or lower and still more preferably 15% or lower.

Further, the fine particles preferably satisfy the relationship represented by the following formula (I):

$$1.06 \times t_M \leq d_A \leq t_G \tag{I}$$

wherein $d_A$ is an average particle size of the fine particles; $t_M$ is a maximum thickness of the surface shaped layer located just above the ink layer; and $t_G$ is a thickness of the surface shaped layer located in a region where no ink layer is formed.

When the average particle size $d_A$ of the fine particles is $1.05 \times t_M$ or larger, even though the fine particles are submerged into the ink layer, the fine particles are protruded on the surface of the surface shaped layer located just above the ink layer, so that the above aimed effects can be sufficiently exhibited. Also, when $d_A$ is not more than $t_G$, the fine particles are prevented from being protruded on the surface of the surface shaped layer in the region where no ink layer is present.

The shape of the fine particles is not particularly limited, and may be a spherical shape, an ellipsoidal shape or a polyhedral shape. Among these fine particles, preferred are spherical fine particles. Meanwhile, in the present invention, the particle size of the fine particles having the other shape than a spherical shape means a value represented by a diameter of a circumscribed sphere.

The content of the fine particles in the surface shaped layer varies depending upon the average particle size and the coefficient of variation (CV value) of particle size distribution thereof, and may be usually selected from the range of from 2 to 20% by mass. When the content of the fine particles is 2% by mass or more, the aimed effects due to inclusion of the fine particles can be suitably exhibited. When the content of the fine particles is 20% by mass or less, the irregular shape formed on the surface of the shaping sheet has a good irregular feel. The content of the fine particles in the surface shaped layer is preferably from 4 to 16% by mass and more preferably from 4 to 13% by mass.

The fine particles may be either inorganic fine particles or organic fine particles. Examples of the inorganic fine particles include particles of silica, alumina, aluminosilicate, kaolinite, calcium carbonate, barium sulfate and glass. Examples of the organic fine particles include particles of acrylic resins, polycarbonate resins, urethane-based resins, urea-based resins, benzoguanamine resins, and condensates of benzoguanamine, melamine and formaldehyde.

These fine particles may be used alone or in combination of any two or more thereof. Among these fine particles, silica particles are preferred in view of the aimed effects of the present invention.

The fine particles may also be used in combination with the baked kaolin particles having similar effects to those of the fine particles.

Figure 6:
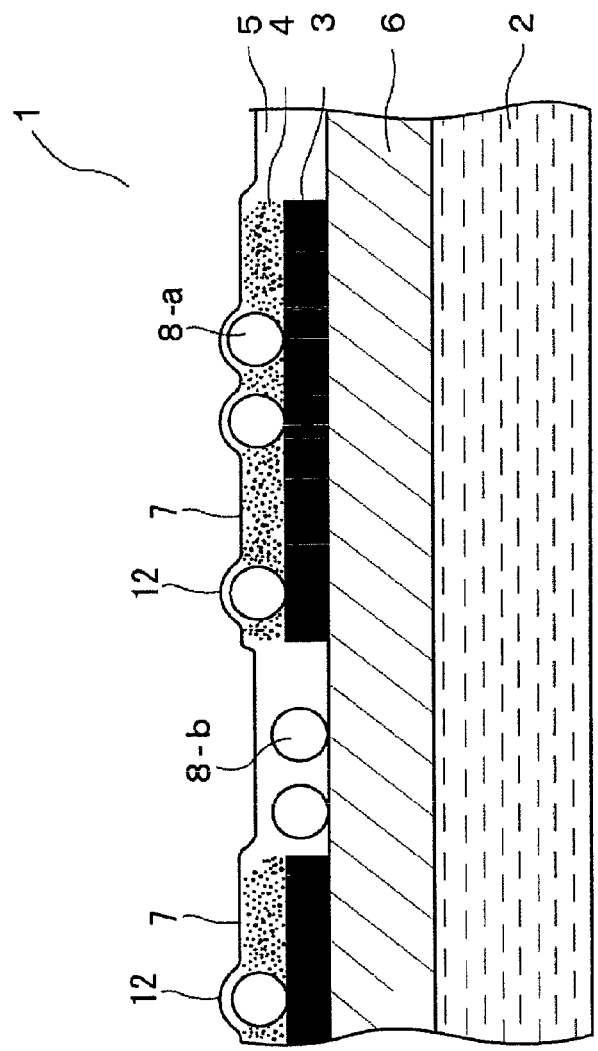
FIG. 6 is a schematic view showing a section of a shaping sheet according to the present invention.
Figure 10:
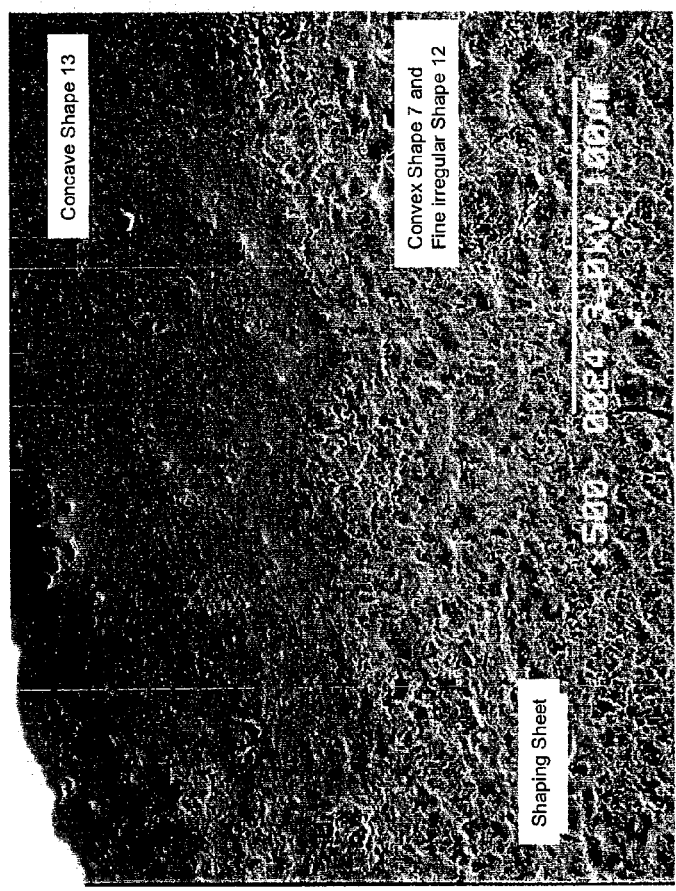
FIG. 10 is a SEM microphotograph showing a surface of the shaping sheet obtained in Example 1.

In FIG. 10, there is shown a SEM microphotograph of a surface of the shaping sheet according to the present invention in which baked kaolin is added to the surface shaped layer 5. The surface portion of the convex shape 7 formed on the surface of the surface shaped layer is formed into a still finer irregular shape. Also, the surface portion other than the convex shape 7 of the surface shaped layer 5 is kept in a flat smooth state. The fine irregular surface 12 formed on the surface portion of the convex shape 7 of the surface shaped layer as shown in the SEM microphotograph of FIG. 10 is illustrated in FIG. 6. Although the mechanism of formation of the fine irregular surface 12 is not clearly determined, from the results of various experiments as well as observation and measurement of samples prepared and due to the fact that the fine irregular surface 12 is formed only on the surface portion of the convex shape 7, it is suggested that the fine irregular surface 12 is generated by a synergistic effect of the interacting region 4 and the baked kaolin particles and/or the fine particles.

Thus, owing to the effects of the irregular shape constructed by the convex shape 7 formed on the surface of the surface shaped layer and the surface portion other than the convex shape 7 as well as the fine irregular surface 12 formed on the surface of the convex shape 7, the shaping sheet of the present invention is capable of forming a fine design pattern with a high-grade feel on a material to be shaped.

The ionizing radiation-curable resin composition used in the present invention may also contain various additives according to required properties of the obtained cured resin layer. Examples of the additives include weather resistance-improving agents, abrasion resistance-improving agents, polymerization inhibitors, crosslinking agents, infrared-absorbing agents, antistatic agents, adhesion-improving agents, antioxidants, leveling agents, thixotropic agents, coupling agents, plasticizers, antifoaming agents, fillers and solvents.

As the weather resistance-improving agents, there may be used ultraviolet-absorbing agents or light stabilizers. The weather resistance-improving agents are added to render the shaping sheet usable for a long period of time. The ultraviolet absorbing agents may be either inorganic or organic compounds. As the preferred inorganic ultraviolet absorbing agents, there may be used particles of titanium dioxide, cerium oxide or zinc oxide which have an average particle size of about 5 to 120 nm. As the organic ultraviolet absorbing agents, there may be used benzotriazole-based compounds. Specific examples of the benzotriazole-based compounds include 2-(2-hydroxy-5-methylphenyl)benzotriazole, 2-(2-hydroxy-3,5-di-tert-aminophenyl)benzotriazole and 3-[3-(benzotriazol-2-yl)-5-tert-butyl-4-hydroxyphenyl]propionic ester of polyethylene glycol. Also, examples of the light stabilizer include hindered amine-based compounds. Specific examples of the light stabilizer include bis(1,2,2,6,6-pentamethyl-4-piperizyl) 2-(3,5-di-tert-butyl-4-hydroxybenzyl)-2'-n-butyl malonate, bis(1,2,2,6,6-pentamethyl-4-piperidyl)sebacate and tetrakis(2,2,6,6-tetramethyl-4-piperidyl)-1,2,3,4-butanetetracarboxylate. In addition, as the ultraviolet absorbing agent or the light stabilizer, there may also be used reactive ultraviolet absorbing agents or reactive light stabilizers having a polymerizable group such as a (meth)acryloyl group in a molecule thereof.

Examples of the inorganic abrasion resistance-improving agent include spherical particles of α-alumina, silica, kaolinite, iron oxide, diamond and silicon carbide. The shape of the inorganic abrasion resistance-improving agent may be a spherical shape, an ellipsoidal shape, a polyhedral shape or a scale-like shape. Among these shapes, preferred is the spherical shape although not particularly limited thereto. Examples of the organic abrasion resistance-improving agent include beads of synthetic resins such as crosslinked acrylic resins and polycarbonate resins. The particle size of the abrasion resistance-improving agent may be usually 30 to 200% of a thickness of the cure resin layer. Among these abrasion resistance-improving agents, spherical α-alumina particles are especially preferred because of high hardness, large effect of improving the abrasion resistance and relatively easy production of the spherical particles.

Examples of the polymerization inhibitor include hydroquinone, p-benzoquinone, hydroquinone monomethyl ether, pyrogallol and t-butyl catechol. Examples of the crosslinking agent used in the present invention include polyisocyanate compounds, epoxy compounds, metal chelate compounds, aziridine compounds and oxazoline compounds.

Examples of the filler include barium sulfate, talc, clay, calcium carbonate and aluminum hydroxide.

Examples of the infrared-absorbing agent include dithiol-based metal complexes, phthalocyanine-based compounds and diimmonium compounds.

In the present invention, the above polymerizable monomers or polymerizable oligomers as the ionizing radiation-curable component and various additives are intimately mixed with each other at a given mixing ratio to prepare a coating solution composed of the ionizing radiation-curable resin composition. The viscosity of the coating solution is not particularly limited, and may be determined so as to form an cured resin layer on a surface of the substrate by the below-mentioned coating methods.

In the present invention, the thus prepared coating solution is applied onto the surface of the substrate in an amount capable of providing a cured coating layer having a thickness of 1 to 20 μm, by known methods such as gravure coating, bar coating, roll coating, reverse roll coating and Komma coating, preferably gravure coating, thereby forming an uncured resin layer thereon. The cured resin layer having a thickness of 1 μm or larger can exhibit good functions as required. The thickness of the cured surface shaped layer is preferably from about 2 to about 20 μm.

In the present invention, the thus formed uncured resin layer is irradiated with an ionizing radiation such as an electron beam and an ultraviolet ray to cure the uncured resin layer. When electron beam is used as the ionizing radiation, an acceleration voltage for the electron beam may be appropriately determined according to the kind of resin used and the thickness of the resin layer, and the uncured resin layer is preferably cured by applying an acceleration voltage of usually from about 70 to about 300 kV thereto.

Meanwhile, upon irradiation of the electron beam, the higher the acceleration voltage becomes, the higher the penetrability of the electron beam can be attained. Therefore, when using a substrate which tends to be deteriorated by exposure to the electron beam, the acceleration voltage may be controlled such that the depth of penetration of the electron beam is substantially identical to the thickness of the resin layer, thereby inhibiting an excessive amount of the electron beam from being irradiated to the substrate and minimizing deterioration of the substrate by irradiation with an excessive amount of the electron beam.

The exposure dose of the electron beam is preferably such an amount capable of saturating a crosslinking density of the resin layer, and may be selected from the range of usually 5 to 300 kGy (0.5 to 30 Mrad) and preferably 10 to 50 kGy (1 to 5 Mrad).

The electron beam source is not particularly limited, and examples of the electron beam source usable in the present invention include various electron beam accelerators such as Cockroft-Walton type, van de Graaff type, resonance transformer type, insulating core transformer type, linear type, Dynamitron type and high-frequency type.

When an ultraviolet ray is used as the ionizing radiation, the ultraviolet ray to be irradiated may have a wavelength of 190 to 380 nm. The ultraviolet ray source is not particularly limited, and examples of the ultraviolet ray source usable in the present invention include a high-pressure mercury lamp, a low-pressure mercury lamp, a metal halide lamp and a carbon arc lamp.

The thus formed cured resin layer may also contain various additives to impart various functions or performances thereto. Examples of the various functions include those capable of attaining a high hardness and a good marring resistance such as functions of so-called hard coat, anti-fogging coat, anti-fouling coat, anti-glare coat, anti-reflecting coat, ultraviolet-shielding coat and infrared-shielding coat.

Figure 7:
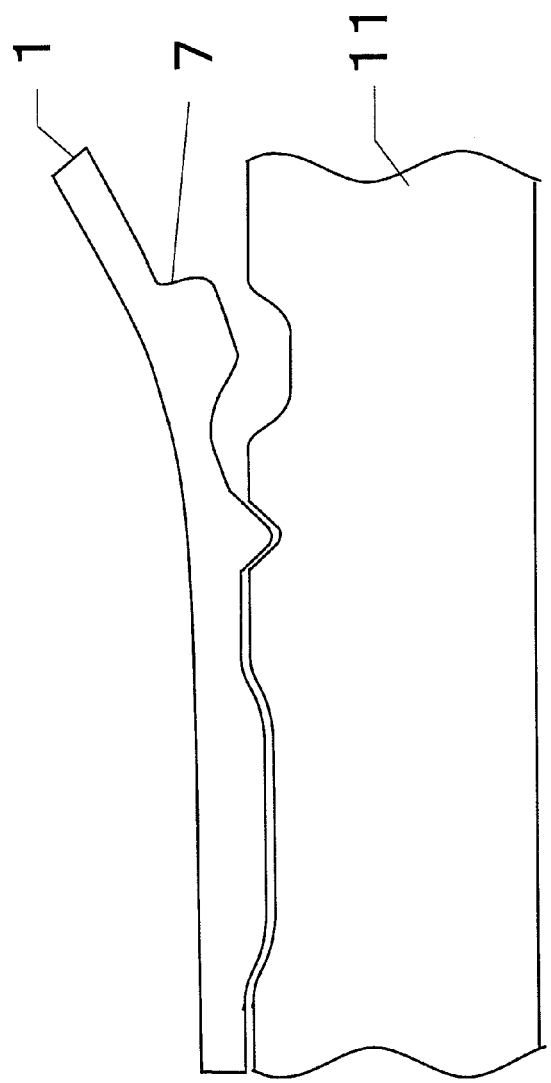
FIG. 7 is a schematic view showing a step for peeling a shaping sheet according to the present invention.

Next, the decorative plate of the present invention is produced by shaping a base plate by using the shaping sheet. In particular, the decorative plate having a fine irregular shape on a surface thereof is preferably produced by inserting the shaping sheet between the base plate as a molded product to be press-molded between heating pressure plates and one of the pressure plates, and then pressing the shaping sheet and the base plate together between the pressure plates. More specifically, as shown in FIG. 7, after completion of the hot-press molding, the shaping sheet 1 is peeled and separated from the decorative plate 11, thereby obtaining the decorative plate 11 whose surface is formed into a desired shape.

The decorative plate 11 of the present invention is not particularly limited as long as it can be produced by using the shaping sheet of the present invention. Among them, preferred are melamine resin decorative plates, diallyl phthalate (DAP) resin decorative plates and polyester decorative plates since these decorative plates have a high surface hardness and excellent heat resistance and stain resistance, as well as good design properties which allow various color patterns to be selectively used therefor. The method for producing these decorative plates is not particularly limited, and the decorative plates may be produced by ordinary known methods, for example, the following methods.

The melamine resin decorative plate may be produced by laminating a melamine resin-impregnated sheet and further a melamine resin-impregnated overlay paper on about four sheets of phenol resin-impregnated core papers; interposing the resultant laminate between two mirror-finished metal plates; inserting the shaping sheet between a surface of the laminate and one of the metal plates; hot-pressing the laminate and the shaping sheet together between the metal plates, for example, under 0.98 MPa at 160° C. for 20 min; and then after cooling the pressed product to room temperature, peeling and separating the shaping sheet from the resultant melamine resin decorative plate.

The diallyl phthalate (DAP) resin decorative plate may be produced by successively laminating diallyl phthalate resin-impregnated papers on a plate-shaped substrate, followed by the same steps as those for production of the melamine resin decorative plate, i.e., by hot-pressing the resultant laminate and the shaping sheet between the two mirror-finished metal plates under 0.98 MPa at a temperature of 140 to 150° C. for about 10 min; and then after cooling the pressed product to room temperature, peeling and separating the shaping sheet from the resultant diallyl phthalate resin decorative plate. The melamine resin decorative plate and the diallyl phthalate resin decorative plate thus produced are both provided on a surface thereof with a fine irregular shape.

The polyester decorative plate may be produced by laminating a sheet optionally imparted with a desired pattern on a substrate; applying a polyester resin to the substrate; placing the shaping sheet fixed in a plastic frame on the resultant laminate; press-bonding the laminate and the shaping sheet together by using a roller; after completion of the reaction, curing the obtained product; and then after cooling the product to room temperature, peeling and separating the shaping sheet from the resultant polyester decorative plate.

In addition, upon production of these decorative plates, the melamine resin-impregnated sheet, the diallyl phthalate resin-impregnated paper or the sheet to be laminated on the polyester resin, is selected from those having a pattern coordinated with that of the shaping sheet, and then the shaping sheet is superposed thereon such that the coordinated patterns are registered with each other, thereby obtaining decorative plates having a coordinated design feel. Also, for the purpose of enhancing the coordinated design feel, the shaping sheet and the decorative plate to be shaped are preferably provided thereon with register marks with which the patterns of the shaping sheet and the decorative plate are registered with each other, followed by subjecting the resultant laminate to hot-pressing or pressure-bonding.

Figure 8:
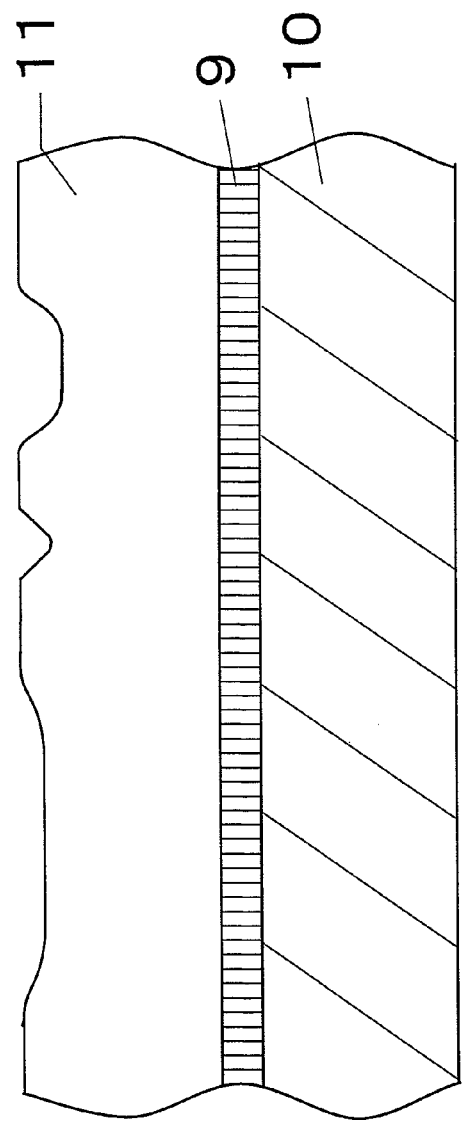
FIG. 8 is a schematic view showing a section of a building material obtained by using a shaping sheet according to the present invention.

The decorative plate 11 of the present invention can be used by adhering to various support plates. More specifically, as shown in FIG. 8, the decorative plate 11 is attached onto a support plate 10 through an adhesive layer 9.

The support plate as an adherend is not particularly limited, and may be appropriately selected from plastic sheets, metal plates, wood plates such as timber, and ceramic materials according to the applications. One or both surfaces of these support plates, in particular, plastic sheet support plates, may be optionally subjected to various physical and chemical surface treatments such as those treatments using oxidation method and convex/concave-forming method in order to enhance adhesion of the support plate to the decorative plate.

Examples of the treatments using the oxidation method include corona discharge treatment, chromate treatment, flame treatment, hot air treatment and ozone/ultraviolet treatment. Examples of the convex/concave-forming method include a sandblast method and a solvent-treating method. The surface treatment to be conducted may be appropriately selected according to the kind of support plate used, and in general, the corona discharge treatment is preferably used because of good effects and facilitated operation thereof.

The plastic sheets may be made of various synthetic resins. Examples of the synthetic resins include polyethylene resins, polypropylene resins, polymethylpentene resins, polyvinyl chloride resins, polyvinylidene chloride resins, polyvinyl alcohol resins, vinyl chloride/vinyl acetate copolymer resins, ethylene/vinyl acetate copolymer resins, ethylene/vinyl alcohol copolymer resins, polyethylene terephthalate resins, polybutylene terephthalate resins, polyethylene naphthalate/isophthalate copolymer resins, polymethyl methacrylate resins, polyethyl methacrylate resins, polybutyl acrylate resins, polyamide resins such as typically nylon 6 and nylon 66, cellulose triacetate resins, cellophane, polystyrene resins, polycarbonate resins, polyallylate resins and polyimide resins.

Examples of the metal plates include those plates made of aluminum, iron, stainless steel, copper, etc. In addition, there may also be used those materials which are coated with these metals by plating.

Examples of the wood plates include sliced veneers, veneers, plywood, particle boards and medium-density fiber (MDF) boards which are made of various materials such as Japanese cryptmeria, hinoki cypress, keyaki, pine, lauan, teak and Melapi. These wood plates may be used alone or in the form of a laminate of any two or more thereof. Meanwhile, the wood plates used herein involve not only plates made of wooden materials, but also plastic plates containing a paper powder and reinforced high-strength papers.

Examples of the ceramic materials include ceramic-based building materials such as gypsum boards, calcium silicate boards and wood chip cement boards, pottery, glass, porcelain enamels, baked tiles and boards made of volcanic ash as a main raw material.

In addition to the above illustrated support plates, there may also be used composite plates of various materials such as a fiber-reinforced plastic (FRP) plate, a plate produced by attaching an iron plate onto both surfaces of a paper honeycomb and a polyethylene resin plate sandwiched between two aluminum plates.

The support plate 10 on which the decorative plate 11 in the form of a cut sheet or a continuous sheet is placed through an adhesive layer 9 is then pressed or compressed using a laminating apparatus such as a cold press, a hot press, a roll press, a laminator, a lapping machine, an edge-bonding machine and a vacuum press to allow the decorative plate 11 to adhere onto a surface of the support plate 10.

The adhesive may be applied using a coating apparatus such as a spray coater, a spreader and a bar coater. Examples of the adhesive include vinyl acetate resin-based adhesives, urea resin-based adhesives, melamine resin-based adhesives, phenol resin-based adhesives and isocyanate-based adhesives. These adhesives may be used alone or in the form of a mixed adhesive obtained by mixing any two or more thereof with each other at an optional mixing ratio. The adhesive may contain, if required, an inorganic powder such as talc, calcium carbonate, clay and titanium white, wheat flour, wood powder, plastic powder, colorants, insecticides, mildew-proof agents, etc. In general, the adhesive has a solid content of 35 to 80% by mass, and is applied onto the surface of the support plate in an amount of 50 to 300 g/m$^2$.

The decorative plate 11 may be usually attached onto the support plate 10 by forming the adhesive layer 9 on a back surface of the decorative plate 11 of the present invention and then bonding the support plate 10 onto the adhesive layer 9, or by applying an adhesive onto the support plate 10 and then bonding the decorative plate 11 onto the support plate 10 through the adhesive.

The thus produced building materials may be cut into an optional size, and then the surface or butt end portion thereof may be subjected to optional decorating processes such as grooving and chamfering by means of a cutting machine such as a router and a cutter. The resultant building materials may be used in various applications, e.g., interior or exterior materials for buildings such as walls, ceilings and floors; surface decorative plates for fittings such as window frames, doors, balustrades, baseboards, verandahs and malls as well as for cabinets of kitchen wares, furniture, light-electrical appliances or OA devices, interior and exterior equipments for vehicles, etc.

EXAMPLES

The present invention will be described in more detail by referring to the following examples. However, it should be noted that these examples are only illustrative and not intended to limit the invention thereto.

(Evaluation Methods)

The shaping sheets and the decorative plates obtained in the respective Examples and Comparative Examples were evaluated by the following methods.

(1) Observation of Surface Shape

The surface shape (such as surface irregularity and pitch of the irregularity) was observed by using an electron microscope "S-2400 Model Scanning Electron Microscope" available from Hitachi High-Technologies Corporation to confirm the effect of the shaping sheet and examine a molding reproducibility upon repeated use.

(2) Measurement of Surface Roughness

The surface shape and the surface roughness (arithmetic mean surface roughness) of a sample to be evaluated having a size of 400 mm in length×400 mm in width were measured by using a three-dimensional non-contact surface shape-measuring system "Micromap" available from Ryoka System Inc. to confirm a shaping effect and a molding reproducibility upon repeated use.

(3) Peel Property (Releasability)

The peel strength of the shaping sheet was measured by using a tension and compression tester "RTC-1250A" available from Orientec Co., Ltd. Using a sample to be evaluated having a size of 25 mm in width×50 mm in length, the peel test was conducted at a peel speed of 300 mm/min in the peel direction of 180° (vertical direction) under a load (by load cell) of 10 N at a measuring environment temperature of 23° C. (room temperature).

(4) Continuous Moldability

The molding was conducted ten times by using the same shaping sheet to measure the peel strength for each molding operation and examine the peel stability of the shaping sheet upon repeated use.

Example 1

A primer ink (acrylic ink "EBF Coordinated Primer" as available from Showa Ink Manufacturing Co., Ltd.) was applied over a whole adhesion-improved surface of a polyester film "A4100 (50 μm)" available from Toyobo Co., Ltd., which was previously subjected to adhesion-improving treatment, by a gravure printing method, thereby forming a penetration-preventing layer 6 (primer layer).

Next, using a pattern printing plate, an urethane-based vessel-printing ink "VESSEL MINI(A)" available from The Inctec Inc. was printed on a vessel portion of a woodgrain pattern to form an ink layer 3. Further, an electron beam-curable resin composition prepared by adding 5% by mass of baked kaolin particles and 2% by mass of a reactive silicone to an electron beam-curable resin "REB-GE" available from Dainichiseika Color & Chemicals Mfg. Co., Ltd., was applied in a coating amount of 4 g/m$^2$ over the ink layer by a gravure offset coater method. After coating, an electron beam was irradiated to the thus applied electron beam-curable resin composition at an acceleration voltage of 175 kV and an exposure dose of 30 kGy (3 Mrad) to cure the composition, thereby forming a surface shaped layer 5 and producing a shaping sheet. The thus produced shaping sheet was provided on a surface portion of the surface shaped layer 5 which is located just above the ink layer 3 and in the vicinity of the portion, with a convex shape raised by 1 to 3 μm from the surface thereof, and had expression of a fine woodgrain pattern with a high-grade feel.

Example 2

A melamine resin-impregnated sheet and further a melamine resin-impregnated overlay paper having a basis weight of about 35 g/m$^2$ were successively laminated on about four sheets of phenol resin-impregnated core papers. The resultant laminate was interposed between two mirror-finished metal plates. The shaping sheet obtained in Example 1 and provided on a surface thereof with an irregular shape was inserted between a surface of the laminate and one of the metal plates, and the laminate and the shaping sheet was hot-pressed together between the metal plates under 0.98 MPa at 160° C. for 20 min.

Then, after cooling the pressed product to room temperature, the shaping sheet was peeled and separated therefrom, thereby obtaining a melamine resin decorative plate provided on a surface thereof with a fine irregular shape.

Example 3

A printed paper was laminated on MDF and was cured for one day to obtain a base plate. A polyester resin prepared by mainly mixing an unsaturated polyester with a peroxide was applied onto the base plate. Then, the shaping sheet fixed in a plastic frame was placed on the coated base plate, and press-bonded thereto by using a roller. After completion of a curing reaction of the polyester resin, the obtained product was cured for 1 h. Then, after cooling the product to room temperature, the shaping sheet was peeled and separated therefrom, thereby obtaining a polyester decorative plate provided on a surface thereof with a fine irregular shape.

Example 4

The same procedure as in Example 2 was repeated except that a pattern of the melamine resin-impregnated sheet was coordinated with that of the shaping sheet, and in order to enhance an accuracy of coordination between the patterns of the shaping sheet and the melamine resin-impregnated sheet, register marks were respectively provided on the shaping sheet and the melamine resin-impregnated sheet to coordinate the patterns thereof with each other, thereby obtaining a melamine resin decorative plate having a coordinated design.

Example 5

The same procedure as in Example 3 was repeated except that a pattern of the printed paper having a re-coatability was coordinated with that of the shaping sheet, and in order to enhance an accuracy of coordination between the patterns of the shaping sheet and the printed paper, register marks were respectively provided on the shaping sheet and the printed paper to coordinate the patterns thereof with each other, thereby obtaining a polyester decorative plate having a coordinated design.

Comparative Example 1

An urethane acrylate-based ultraviolet-curable resin "XD-808" available from Dainichiseika Color & Chemicals Mfg. Co., Ltd., was applied onto an adhesion-improved surface of a PET film "A4100 (100 μm)" available from Toyobo Co., Ltd., which was previously subjected to adhesion-improving treatment, by a drum printing film method (hereinafter referred to merely as "DPS" method), thereby forming a convex pattern layer thereon.

An irregular woodgrain pattern (depth: 70 μm; width of each of convex and concave portions: 35 μm) was formed on an intaglio printing roll surface by an etching method. Meanwhile, the line speed used in the DSP method was 10 m/min, and an ultraviolet light was irradiated by using two 160 W ozone high-pressure mercury lamps available from Nippon Denchi Co., Ltd.

The thus obtained shaping sheet was provided thereon with an irregular shape. Using the resultant shaping sheet, the same procedure as in Example 2 was repeated to produce a melamine resin decorative plate.

Comparative Example 2

A silicone-based liquid repelling resin "REP" available from Dainichiseika Color & Chemicals Mfg. Co., Ltd., was printed onto a PET film "A4100 (25 μm)" available from Toyobo Co., Ltd., which was previously subjected to adhesion-improving treatment, by a gravure printing method, thereby partially forming a pattern layer in the form of spots.

Next, a resin composition to be applied onto the pattern layer was prepared as follows. Calcium carbonate ($CaCO_3$) having a particle size of 3 μm and silica gel ($SiO_2$) having a particle size of 10 μm were mixed with each other at a mixing mass ratio of 28:2 to produce a filler. In addition, a binder was prepared from 100 parts by mass of an acrylic polyol and 8.5 parts by mass of a polyisocyanate. 52 parts by mass of the filler, 48 parts by mass of the binder and 4 parts by mass of an amino-modified silicone oil as a releasing agent were blended with each other to prepare a resin composition for forming a fine irregular layer.

The thus obtained resin composition was applied over a whole surface of the PET film on which the pattern was already formed, by a slit reverse coating method, dried at 110° C. for 30 s and then aged at 60° C. for 3 days, thereby obtaining a shaping sheet.

Using the thus obtained shaping sheet, the same procedure as in Example 2 was repeated to produce a melamine resin decorative plate.

Figure 9:
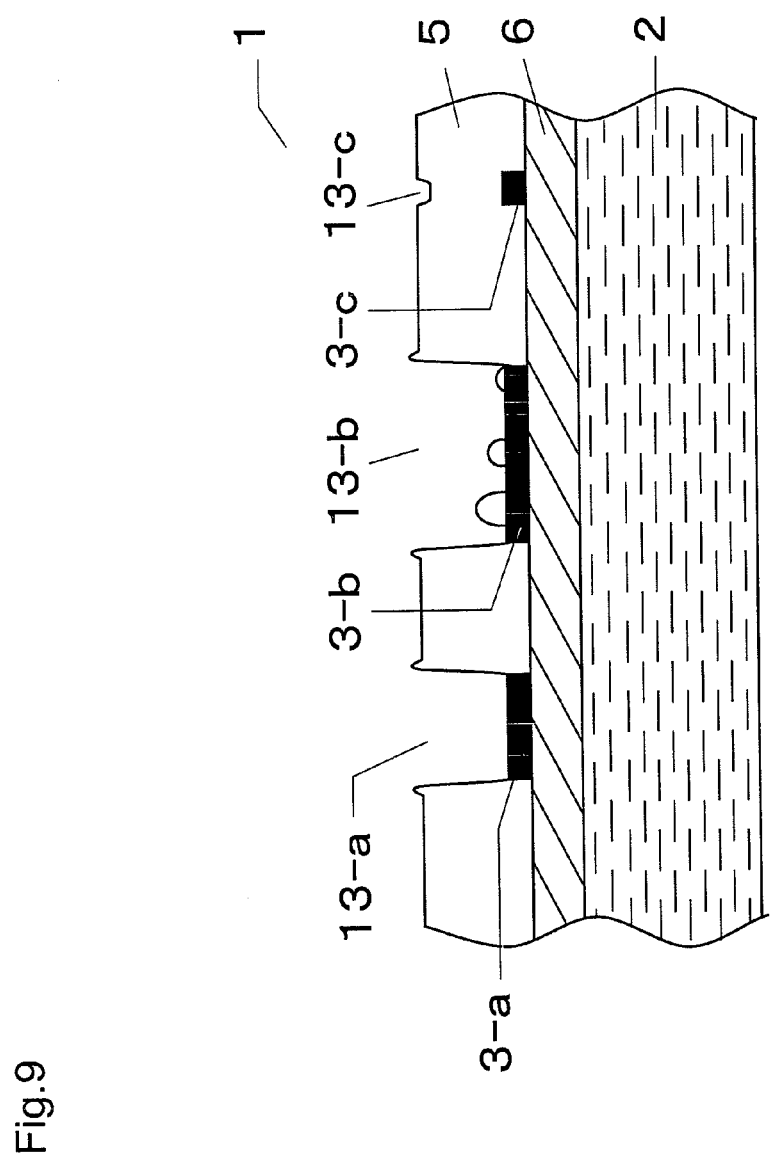
FIG. 9 is a schematic view showing a section of the shaping sheet obtained in Comparative Example 2.

The surface configuration of the shaping sheet obtained in Comparative Example 2 is explained by referring to FIG. 9. The irregular shape of the shaping sheet obtained in Comparative Example 2 was produced by repelling only the resin composition for forming an irregular layer which was applied onto the ink layer made of the liquid repelling resin to thereby form a concave shape 13. However, in the ink layer 3-b having a too large width, a part of the resin composition applied onto such an ink layer made of the liquid repelling resin remained thereon, resulting in formation of a unclear concave shape 13-b. On the other hand, in the ink layer 3-c having a too small width, almost all of the resin composition applied onto such an ink layer made of the liquid repelling resin remained unrepelled, resulting in unsatisfactory concave shape as indicated by 13-c. Thus, upon producing the shaping sheet of Comparative Example 2, the width of the ink layer must be limited to from about 100 to about 200 μm in order to clearly repel the resin composition from the ink layer made of the liquid repelling resin.

Therefore, as compared to the shaping sheet of the present invention capable of expressing a width of several aim, in the shaping sheet obtained in Comparative Example 2, the irregular shape formed by repelling the resin composition from the ink layer made of the liquid repelling resin failed to express a narrow vessel shape, so that the width of the concave shape was limited to a predetermined range, resulting in monotonous and rough expression of shaped patterns. In addition, upon production of the irregular shape, a pattern formed by the irregular shape of the shaping sheet obtained in Comparative Example 2 generally became unstable owing to occurrence and non-occurrence of repelling of the resin composition from the ink layer made of the liquid repelling resin.

Figure 11:
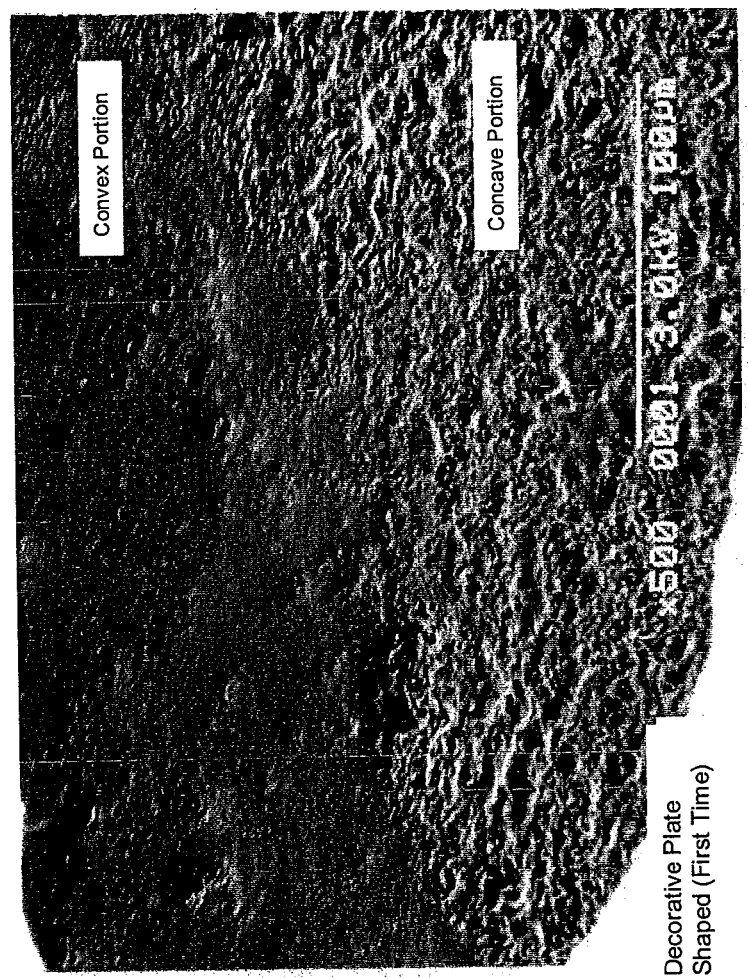
FIG. 11 is a SEM microphotograph showing a surface of a decorative plate shaped for the first time by using the shaping sheet obtained in Example 1.
Figure 12:
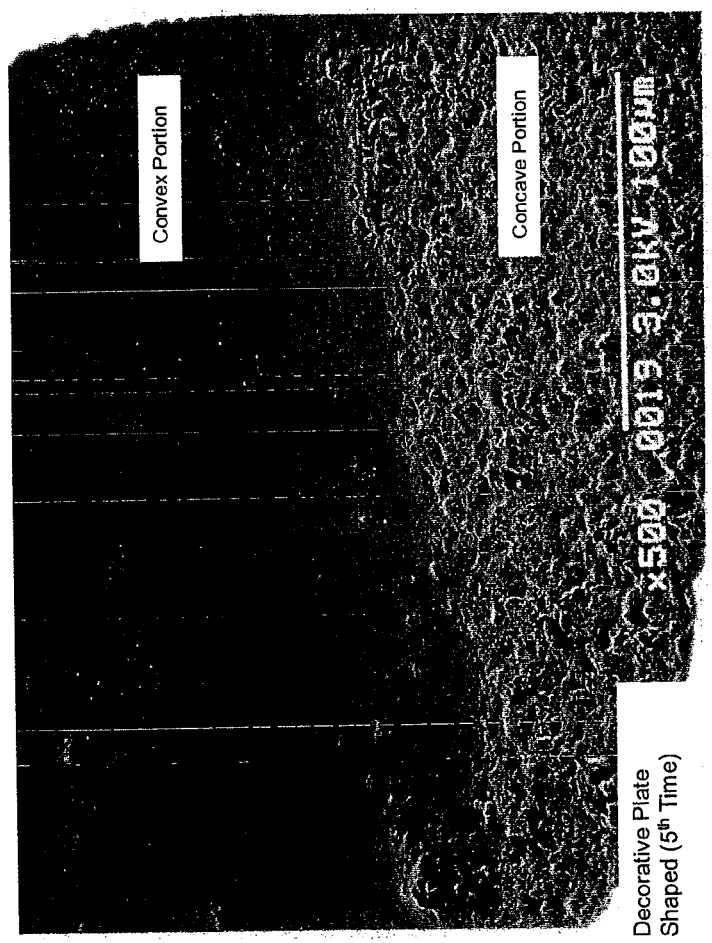
FIG. 12 is a SEM microphotograph showing a surface of a decorative plate shaped for the fifth time by using the shaping sheet obtained in Example 1.
Figure 13:
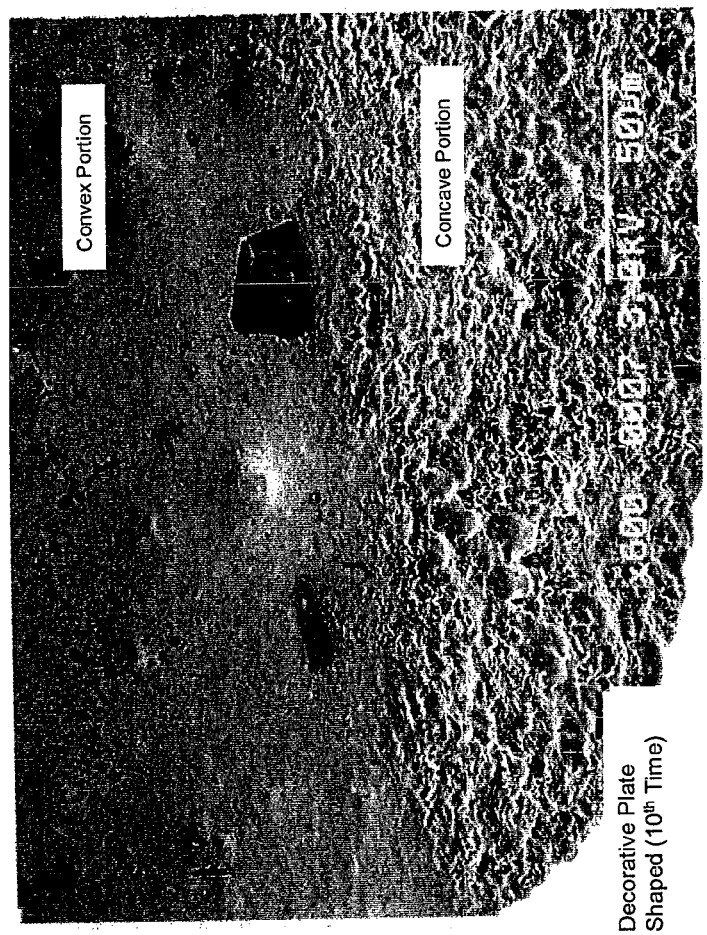
FIG. 13 is a SEM microphotograph showing a surface of a decorative plate shaped for the tenth time by using the shaping sheet obtained in Example 1.

The irregular shape formed on the decorative plate obtained in Example 2 was very fine, thereby enabling expression of design with a high-grade feel. In addition, the shaping sheet obtained in Example 1 had a high durability and was completely free from change in surface shape and peel property (easiness of peel) after shaping even when repeatedly used ten times. Further, as shown in the SEM microphotographs of FIGS. 11 to 13, in the decorative plate shaped by using the shaping sheet of the present invention, the convex-shaped portion (portion shaped by the concave shape 13 of the shaping sheet) and the concave-shaped portion (portion shaped by the convex shape 7 of the shaping sheet) both showed a clear shape even after the shaping was repeated ten times. The decorative plate maintained a fine irregular shape in the shaped irregular portion thereof, and was completely free from any change in the irregular shape.

The decorative plate obtained in Comparative Example 1 had a good expression of dynamic irregular feel, but failed to express a fine irregular shape. In addition, in the decorative plate of Comparative Example 1, it was required to use a thick sheet having a high tenacity owing to problems upon production of the film, resulting in increase in production costs. The durability and peel property attained in Comparative Example 1 were identical to those in Example 2.

In Comparative Example 2, since the irregular shape was expressed and formed by the repelling method, it was not possible to realize expression of a narrow vessel shape, thereby failing to express fineness of the pattern. Also, when used repeatedly, the shaping sheet suffered from deterioration in a surface shape due to thermal deformation thereof, resulting in poor peel property after the shaping.

Industrial Applicability

In accordance with the present invention, it is possible to obtain a shaping sheet having a fine irregular shape which is capable of shaping a fine pattern with a high-grade feel and exhibits an excellent releasability, as well as a decorative plate having a fine irregular shape shaped by the shaping sheet. In particular, when a fine pattern such as woodgrain pattern is formed on the shaping sheet, an irregular feel of a vessel portion of the woodgrain pattern can be expressed with reality, and the decorative plate shaped by the shaping sheet has the same texture as that of actual wood material.

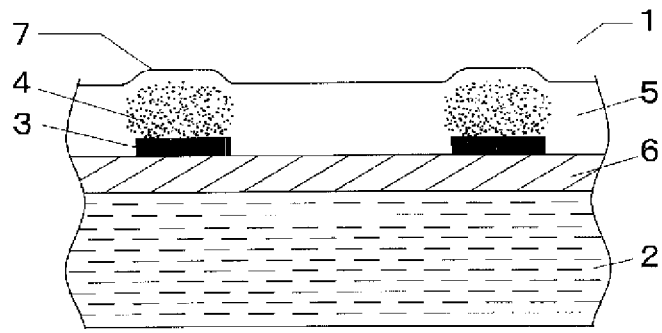

The invention claimed is:

1. A shaping sheet comprising a substrate, at least an ink layer partially formed on the substrate, said ink layer including a non-crosslinked resin as a binder, wherein said non-crosslinked resin as a binder is a thermoplastic non-crosslinked urethane resin having an average molecular weight of 10,000 to 50,000 and a glass transition temperature of about −70° to −40° C., and a surface shaped layer which is present on and contacted with the ink layer so as to cover a whole surface including both a region where the ink layer is formed and a region where no ink layer is formed, wherein the surface shaped layer is formed by crosslinking and curing an ionizing radiation-curable resin composition, and has a convex shape on a surface thereof which is located in a portion just above the ink layer, and wherein the surface shaped layer comprises an interacting region extending from the ink layer and in contact with the ink layer, the interacting region being formed of material of the ink layer and the ionizing radiation-curable resin composition of the surface shaped layer.

2. The shaping sheet according to claim 1, wherein the ionizing radiation-curable resin composition contains a (meth)acrylate monomer.

3. The shaping sheet according to claim 1, wherein an ink forming the ink layer has an uneven thickness.

4. The shaping sheet according to claim 3, wherein the ink layer has a first film region having a first thickness and a second film region having a second thickness, the first thickness being greater than the second thickness, and the surface shaped layer is provided on a surface thereof with a convex shape having a first height which is located on a portion just above the first film region, and with a convex shape having a second height which is located on a portion just above the second film region, the first height being greater than the second height.

5. The shaping sheet according to claim 1, wherein the convex shape has a height of from 1 to 10 μm.

6. The shaping sheet according to claim 1, wherein the surface shaped layer contains a reactive silicone.

7. The shaping sheet according to claim 1, wherein an ink forming the ink layer contains an extender pigment.

8. The shaping sheet according to claim 1, wherein the ionizing radiation-curable resin composition is an electron beam-curable resin composition.

9. The shaping sheet according to claim 1, wherein a content of the thermoplastic non-crosslinked urethane resin in ink of the ink layer is 50% by mass or higher.

10. The shaping sheet according to claim 1, being capable of shaping a surface of a base plate of a decorative plate.

11. The shaping sheet according to claim 1, being capable of shaping a surface of a base plate of a decorative plate to have concave portions.

12. The shaping sheet according to claim 1, wherein a resin component of the ink layer and uncured ionizing radiation-curable resin composition for forming the surface shaped layer are not completely compatibilized with each other and are kept in a suspended state, fixed by crosslinking and curing the ionizing radiation-curable resin composition, such that said shaping sheet has said interacting region formed in the surface shaped layer above the ink layer, thereby generating the convex shape.

13. The shaping sheet according to claim 1, wherein the ink layer has a resin component, and the resin component of the ink layer is capable of interacting with the ionizing radiation-curable resin composition, prior to curing of the ionizing radiation-curable resin composition, to cause elution, dispersion and mixing therebetween.

14. The shaping sheet according to claim 1, wherein said surface shaped layer includes baked kaolin particles.

15. The shaping sheet according to claim 1, wherein the ionizing radiation-curable resin composition includes fine particles blended therein, which protrude on the surface of the surface shaped layer above the ink layer.

16. The shaping sheet according to claim 6, wherein said reactive silicone is bonded to a resin of the crosslinked and cured ionizing radiation-curable resin composition.

17. The shaping sheet according to claim 1, wherein said thermoplastic non-crosslinked urethane resin has a linear molecular structure.

18. The shaping sheet according to claim 1, wherein said ink layer further includes an unsaturated polyester resin.

19. The shaping sheet according to claim 1, wherein the interacting region extends into the surface shaped layer in a thickness direction thereof, but not through an entire thickness of the surface shaped layer.

20. The shaping sheet according to claim 1, wherein the interacting region extends through the entire thickness of the surface shaped layer.

* * * * *

UNITED STATES PATENT AND TRADEMARK OFFICE
CERTIFICATE OF CORRECTION

PATENT NO. : 9,120,248 B2
APPLICATION NO. : 11/814580
DATED : September 1, 2015
INVENTOR(S) : Nobuo Saitou et al.

It is certified that error appears in the above-identified patent and that said Letters Patent is hereby corrected as shown below:

Title page:

(*) Notice:, and (21) Appl. No.:

Reprint the first page of U.S. Patent No. 9,120,248 B2 without overlap of item (21), Application No. "11/814,580", over the sentence "[t]his patent is subject to a terminal disclaimer".

Signed and Sealed this
Fifteenth Day of March, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,120,248 B2 | |
| APPLICATION NO. | : 11/814580 | |
| DATED | : September 1, 2015 | |
| INVENTOR(S) | : Nobuo Saitou et al. | |

It is certified that error appears in the above-identified patent and that said Letters Patent is hereby corrected as shown below:

Delete title page and substitute therefore with the attached title page without misprint of overlapping text in Item (21), wherein the Application Number "11/814,580" is printed over a portion of the sentence "[t]his patent is subject to a terminal disclaimer.".

This certificate supersedes the Certificate of Correction issued March 15, 2016.

Signed and Sealed this
Seventeenth Day of May, 2016

Michelle K. Lee
*Director of the United States Patent and Trademark Office*

(12) United States Patent
Saitou et al.

(10) Patent No.: US 9,120,248 B2
(45) Date of Patent: *Sep. 1, 2015

(54) SHAPED SHEET

(75) Inventors: Nobuo Saitou, Saitama (JP); Toshitake Kobayashi, Saitama (JP); Kenichi Tachihara, Chiba (JP); Takashi Iizuka, Saitama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 1752 days.

This patent is subject to a terminal disclaimer.

(21) Appl. No.: 11/814,580
(22) PCT Filed: Jan. 25, 2006
(86) PCT No.: PCT/JP2006/301141
§ 371 (c)(1),
(2), (4) Date: Jul. 24, 2007
(87) PCT Pub. No.: WO2006/080348
PCT Pub. Date: Aug. 3, 2006

(65) Prior Publication Data
US 2009/0011191 A1    Jan. 8, 2009

(30) Foreign Application Priority Data
Jan. 25, 2005  (JP) ................... 2005-016715

(51) Int. Cl.
*B32B 3/26* (2006.01)
*B29C 59/02* (2006.01)
(Continued)

(52) U.S. Cl.
CPC ............ *B29C 33/424* (2013.01); *B29C 33/40* (2013.01); *B29C 37/0053* (2013.01);
(Continued)

(58) Field of Classification Search
CPC .. B29C 33/40; B29C 33/424; B29C 30/0053; B29C 59/022; B29C 37/0053; B29C 2059/023; B44C 3/025; B44C 5/04; B44F 5/00; B29L 2031/722; B32B 38/0008; B32B 38/14; B32B 2310/14; B32B 2317/125; Y10T 428/24521; Y10T 428/24612
See application file for complete search history.

(56) References Cited

U.S. PATENT DOCUMENTS 5,130,072 A * 7/1992 Hemels et al. ............ 264/112
5,266,397 A * 11/1993 Ogawa et al. ............. 428/323
(Continued)

FOREIGN PATENT DOCUMENTS

EP  0 680 824   11/1995
JP  57-117922    7/1982
(Continued)

OTHER PUBLICATIONS

Machine Translation of JP 2003-340975.*
(Continued)

*Primary Examiner* — Gerard Higgins
*Assistant Examiner* — Sathavaram I Reddy
(74) *Attorney, Agent, or Firm* — Fitch Even Tabin & Flannery

(57) ABSTRACT

There are provided a shaping sheet provided on a surface thereof with a fine irregular shape which is capable of forming a fine pattern with a high-grade feel on a material to be shaped, and is excellent in releasability from the material, as well as a decorative plate shaped by the shaping sheet. The shaping sheet of the present invention includes a substrate, at least an ink layer partially formed on the substrate and a surface shaped layer which is present on and contacted with the ink layer so as to cover a whole surface including both a region where the ink layer is formed and a region where no ink layer is formed, wherein the surface shaped layer is formed by crosslinking and curing an ionizing radiation-curable resin composition, and has a convex shape on a surface thereof which is located in a portion just above the ink layer and in the vicinity of the portion. The shaping sheet is provided on a surface thereof with a fine irregular shape, which is capable of forming a fine pattern with a high-grade feel on a material to be shaped, and excellent in releasability from the material.

20 Claims, 13 Drawing Sheets